(12) United States Patent
Schober et al.

(10) Patent No.: US 12,456,366 B2
(45) Date of Patent: Oct. 28, 2025

(54) SENSING DEVICE FOR SENSING AN ENVIRONMENTAL PARAMETER AND METHOD FOR DETERMINING INFORMATION ABOUT A FUNCTIONAL STATE OF A SENSING DEVICE

(71) Applicant: Infineon Technologies AG, Neubiberg (DE)

(72) Inventors: Sebastian Schober, Munich (DE); Cecilia Carbonelli, Munich (DE)

(73) Assignee: Infineon Technologies AG, Neubiberg (DE)

( * ) Notice: Subject to any disclaimer, the term of this patent is extended or adjusted under 35 U.S.C. 154(b) by 351 days.

(21) Appl. No.: 17/658,528

(22) Filed: Apr. 8, 2022

(65) Prior Publication Data
US 2022/0335817 A1    Oct. 20, 2022

(30) Foreign Application Priority Data
Apr. 15, 2021    (EP) ..................................... 21168583

(51) Int. Cl.
*G08C 17/02* (2006.01)
*G01D 21/02* (2006.01)
(Continued)

(52) U.S. Cl.
CPC ............. *G08C 17/02* (2013.01); *G01D 21/02* (2013.01); *G06F 18/2411* (2023.01);
(Continued)

(58) Field of Classification Search
None
See application file for complete search history.

(56) References Cited

U.S. PATENT DOCUMENTS

| 5,910,765 A | * | 6/1999 | Slemon | ..................... G01D 1/00 |
| | | | | 340/517 |
| 2009/0002148 A1 | * | 1/2009 | Horvitz | ................ G08G 1/0112 |
| | | | | 340/514 |

(Continued)

FOREIGN PATENT DOCUMENTS

WO    WO-2010144947 A1 *    12/2010   ........... G05B 13/027

OTHER PUBLICATIONS

Liu, Jingjing et al., "Sensor Fault Detection and Diagnosis Method for AHU Using 1-D CNN and Clustering Analysis", Hindawi, Computational Intelligence and Neuroscience, vol. 2019, Article ID 5367317, http:doi.org/10.1155/2019/5367217, China, Sep. 26, 2019, 21 pages.

(Continued)

*Primary Examiner* — Lisa M Caputo
*Assistant Examiner* — Cynthia L Davis
(74) *Attorney, Agent, or Firm* — Slater Matsil, LLP

(57) ABSTRACT

In accordance with an embodiment, a sensing device for sensing an environmental parameter includes a measurement module configured for providing a sequence of measurement values in dependence on the environmental parameter; a communication module configured for communicating with a further sensing device; and a function analysis module coupled to the measurement module and the communication module. The function analysis module configured for using a neural network for determining a first temporal feature on the basis of the sequence of measurement values, and determining, on the basis of the first temporal feature and on the basis of a second temporal feature provided by the further sensing device, information about a functional state of the measurement module.

22 Claims, 15 Drawing Sheets

(51) Int. Cl.
   *G06F 18/2411* (2023.01)
   *G06N 3/045* (2023.01)
   *H04L 67/12* (2022.01)
(52) U.S. Cl.
   CPC ............. *G06N 3/045* (2023.01); *H04L 67/12* (2013.01); *G06F 2218/12* (2023.01)

(56) References Cited

U.S. PATENT DOCUMENTS

| | | | |
|---|---|---|---|
| 2018/0299417 A1* | 10/2018 | Cha | G01N 33/0067 |
| 2020/0020038 A1* | 1/2020 | Haile | H04L 63/0861 |
| 2020/0394499 A1* | 12/2020 | Yao | G06N 3/045 |
| 2022/0268827 A1* | 8/2022 | Sun | G01R 31/088 |

OTHER PUBLICATIONS

Mahapatro, Arunanshu, et al., "Fault Diagnosis in Wireless Sensor Networks: A Survey," in IEEE Communications Surveys & Tutorials, vol. 15, No. 4, Fourth Quarter, Mar. 28, 2013, 27 pages.

Obst, Oliver, "Distributed Fault Detection in Sensor Networks using a Recurrent Neural Network", CSIRO ICT Centre, Automonous Systems Laboratory, Australia, Dec. 6, 2009, 10 pages.

Wang, Qingfeng et al., "Research on air pollution gases recognition method based on LSTM recurrent neural network and gas sensors array", IEEE Chinese Automation Congress (CAC), Nov. 30-Dec. 2, 2018, China, 6 pages.

\* cited by examiner

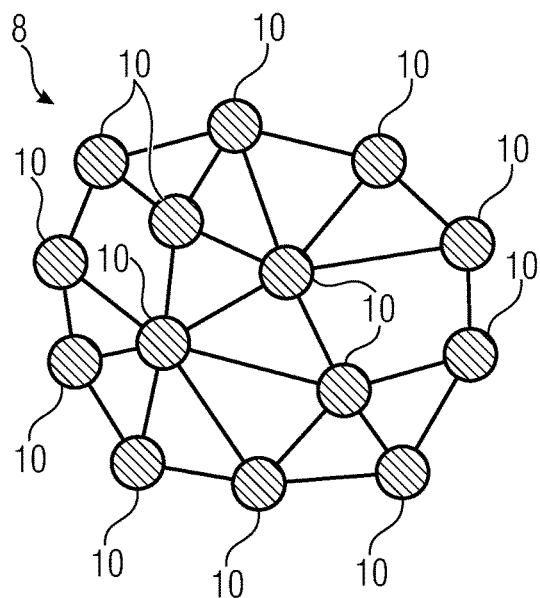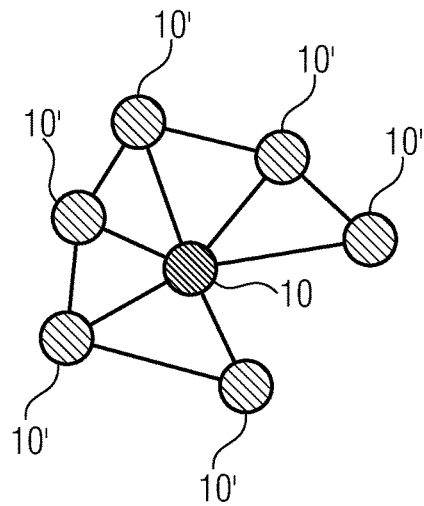
Fig. 1a  Fig. 1b
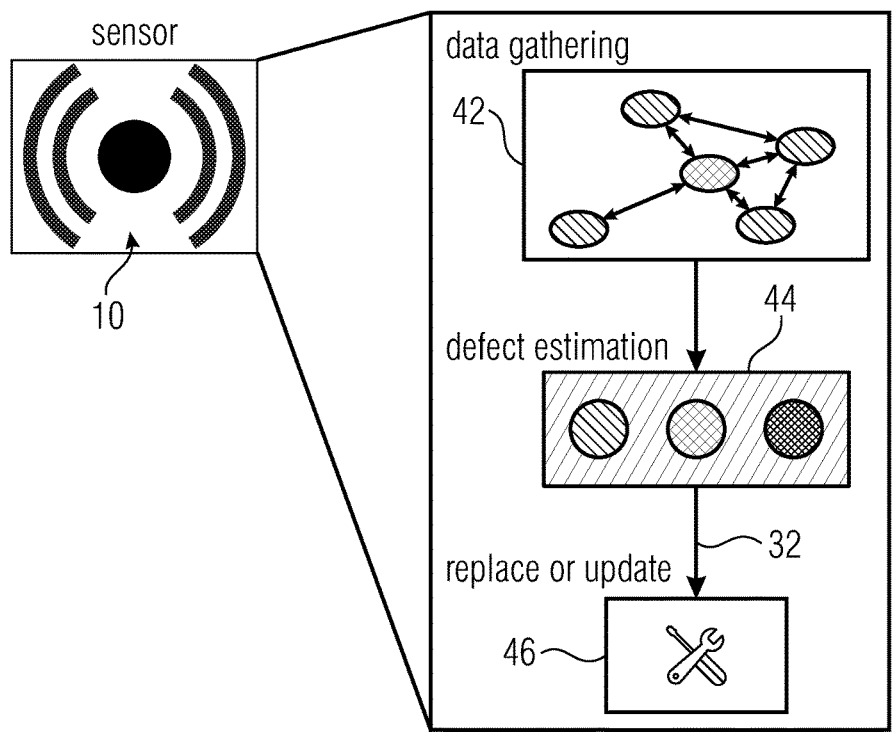
Fig. 1c

SENSING DEVICE FOR SENSING AN ENVIRONMENTAL PARAMETER AND METHOD FOR DETERMINING INFORMATION ABOUT A FUNCTIONAL STATE OF A SENSING DEVICE

This application claims the benefit of European Patent Application No. 21168583, filed on Apr. 15, 2021, which application is hereby incorporated herein by reference.

TECHNICAL FIELD

Examples of the present disclosure relate to a sensing device for sensing an environmental parameter. Some examples relate to gas sensing device for sensing a concentration of a target gas. Further examples to a method for determining information about a functional state of a sensing device, for example a gas sensing device. Some examples relate to an internet of things (IOT) and machine learning based fault detection for low cost environmental gas sensors.

BACKGROUND

Environmental sensors are an important tool to monitor the air quality of populated areas and also indoors, where they are assembled as sensor networks, e.g., wireless sensor networks (WSN), to cover large areas. However, low-cost environmental sensors, such as electrochemical gas sensors can degrade over time, e.g., caused by sensor poisoning, aging or hardware related problems. The resulting sensitivity loss or complete shutdown of the sensor is then harmful to the overall accuracy and quality of the network overall. Therefore, it is important to recognize such defects in-situ in order to know, when these low-cost sensors have to be switched out and to suppress misleading signals from affected sensors.

In the area of wireless sensor networks of environmental sensors, several approaches for detecting and/or handling faults are known, as for example described in A. Mahapatro and P. M. Khilar, "Fault Diagnosis in Wireless Sensor Networks: A Survey," in *IEEE Communications Surveys & Tutorials*, vol. 15, no. 4, pp. 2000-2026, Fourth Quarter 2013. Many approaches are concerned with drift compensation. Typical ways of handling faults are either an introduction of hardware redundancy, coming with additional costs and complexity, or a soft analytical approach where a mathematical model is first derived and then compared with a physical measurement obtained at the sensor. In case the gap between the two models is larger than a certain threshold, a fault alarm is raised.

However, in view of the state of the art, it is desirable to have a concept for obtaining information about a functional state of a sensing device, the concept providing an improved tradeoff between reliability of a fault detection, an ability to diagnose a detected fault, low requirements regarding computational power and a low data traffic.

SUMMARY

An example according to the present disclosure provides a sensing device for sensing an environmental parameter, for example a gas sensing device for sensing a concentration of a target gas. The sensing device comprises a measurement module, which is configured for providing a sequence of measurement values in dependence on the environmental parameter. The sensing device further comprises a communication module configured for communicating with at least one further sensing device, for example, via a network communication interface, a wireless communication interface, or a wireless communication network. The sensing device further comprises a function analysis module, which is configured for using at last one neural network for determining at least one temporal feature on the basis of the sequence of measurement values. The functional analysis module is further configured for using the neural network for determining, on the basis of the temporal feature and on the basis of at least one further temporal feature provided by the further sensing device, information about a functional state of the measurement module. For example, the information about the functional state of the measurement module may indicate a fault or a defect of the measurement module.

Another example of the present disclosure provides a method for determining information about a functional state of a sensing device. The method comprises a step of providing a sequence of measurement values of an environmental parameter to which the sensing device is sensitive. The method further comprises communicating with at least one further sensing device. The method comprises a step of using at least one neural network for determining at least one temporal feature on the basis of the sequence of measurement values. Further, the method comprises using the neural network for determining, on the basis of the temporal feature and on the basis of at least one further temporal feature provided by the further sensing device, the information about the functional state of the sensing device.

BRIEF DESCRIPTION OF THE DRAWINGS

Examples and advantageous implementations of the present disclosure are described in more detail below with respect to the figures, among which:

FIGS. 1a-1c illustrate an example of a sensing network.

DETAILED DESCRIPTION OF ILLUSTRATIVE EMBODIMENTS

Figure 2:
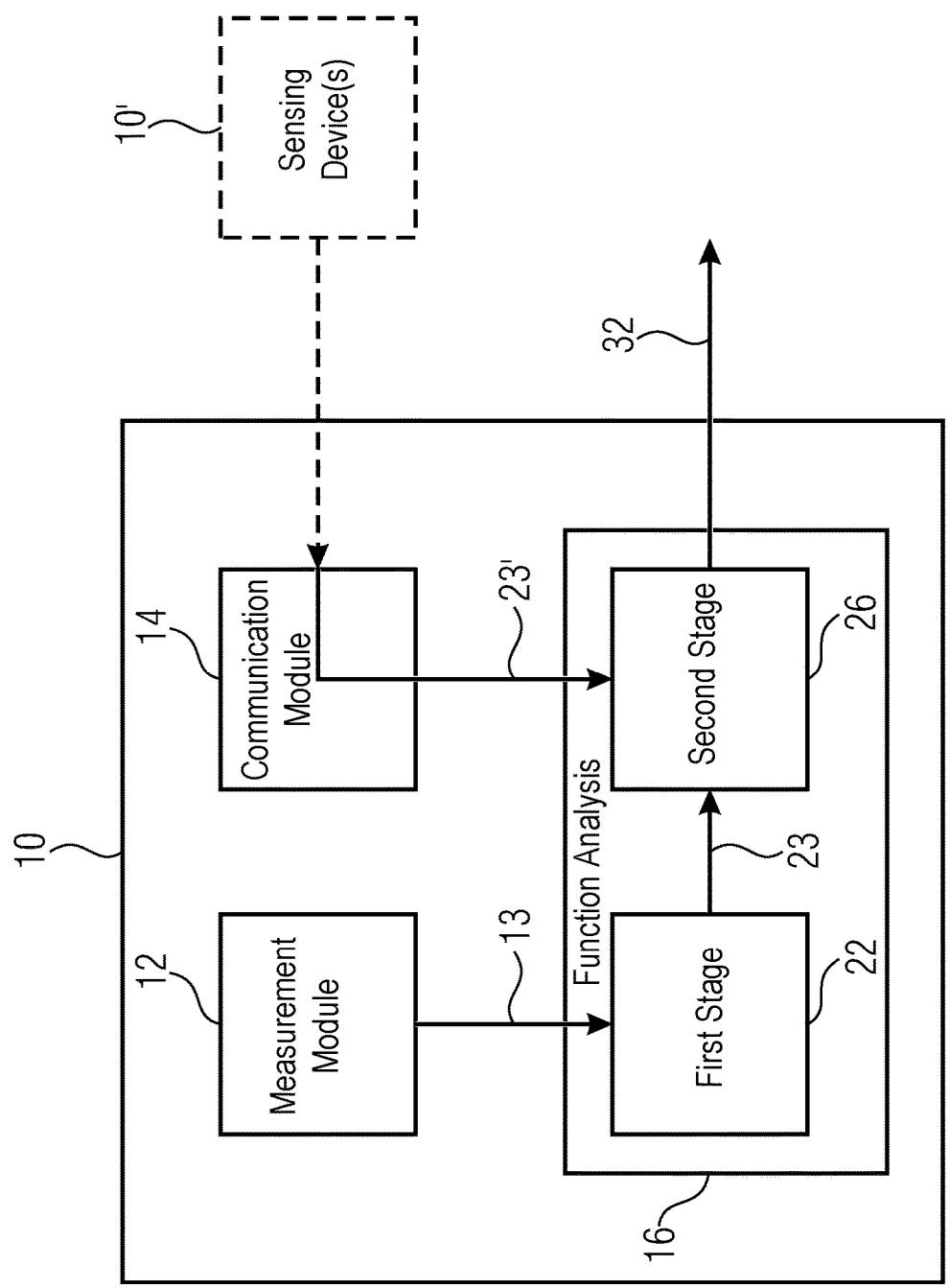
FIG. 2 illustrates an example of a sensing device.

In the following, examples are discussed in detail, however, it should be appreciated that the examples provide many applicable concepts that can be embodied in a wide variety of sensing devices. The specific examples discussed are merely illustrative of specific ways to implement and use the present concept, and do not limit the scope of the examples. In the following description, a plurality of details is set forth to provide a more thorough explanation of examples of the disclosure. However, it will be apparent to one skilled in the art that other examples may be practiced without these specific details. In other instances, well-known structures and devices are shown in form of a block diagram rather than in detail in order to avoid obscuring examples described herein. In addition, features of the different examples described herein may be combined with each other, unless specifically noted otherwise.

In the following description of examples, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different examples.

Examples of the present disclosure rely on the idea that a sensing device determines, on the basis of a sequence of measurement values of the sensing device, a temporal feature. Thus, the temporal feature may represent a temporal characteristic of the sequence of measurement values. The sensing device determines information about a functional state of the sensing device on the basis of the determined temporal feature and on the basis of a further temporal feature provided by a further sensing device. For example, the further sensing device may determine the further temporal feature equivalently to the determination of the temporal feature by the sensing device. Consequently, the determination of the information about the functional state may rely on both, a temporal characteristic of the sequence of measurement values, and a relation between measurement values of the sensing device and the further sensing device, in which, for example, a spatial relation between the sensing device and the further sensing device may be considered.

FIG. 1a illustrates a sensor network 8 according to an example of the present disclosure. The sensor network 8 comprises a plurality of sensing devices 10. The sensing devices 10 of the sensor network 8 are interconnected via a communication network, e.g., a wireless communication network, or are interconnected via a communication interface such as a wireless communication interface. That is, for example, a sensing device 10 of the sensing network 8 is connected with one or more of the sensing devices 10 of the communication network 8 via the communication interface. For example, the communication interface provides a proximity based connection, or, in other words, is a short-range (wireless) communication interface, e.g., Bluetooth. Thus, a sensing device 10 of the sensing network 8 may be connected to one or more further sensing devices, which are within the range of the communication interface.

The sensing devices 10 are for sensing an environmental parameter. For example, the sensing devices 10 of the sensor network 8 may be distributed over an area so as to measure the environmental parameter at different locations within the area.

FIG. 1b illustrates one of the sensing devices 10 of the sensor network 8 in conjunction with further sensing devices 10' of the sensor network 8 to which the one sensing device 10 is connected. A sensing device 10 of the sensor network 8 may also be referred to as node of the sensor network 8. Thus, FIG. 1b illustrates a node of the sensor network 8 and its connected neighbors including their connectivity relations to each other.

Thus, an example of the present disclosure provides a sensor network 8, which is interconnected via Bluetooth or other short-range communication technology. The existence of a connection between two of these sensors 10 may depend on the distance between them. Interconnected sensors 10 may exchange data, for example on a regular basis, on their current operational state such as a current sensitivity, or on currently measured data of the environmental parameter. The data may then be used, for example, by one of the sensing devices 10, to estimate a functional state such as quality state of the sensing device 10. Such an estimation may be performed on the edge by each of the sensing devices 10 and therefore may be independent on cloud solutions. In other words, the estimation may be performed each of the sensing devices 10 itself. For example, referring to FIG. 1b, the sensing device 10 may perform a quality estimation for itself using state information, which is sent to the sensing device 10 by the further sensing devices 10' connected to the sensing device 10.

FIG. 1c illustrates an example for processing steps, which may be performed by each of the sensing devices 10. In a step of data gathering 42, the sensing device 10 may acquire measurement values of the environmental parameter, and may further receive information or data from the further sensing devices 10'. In step 44, the sensing device 10 may determine an estimation for a defect of the sensing device 10 based on the data gathered in step 42 or information derived from that data. More generally, the sensing device 10 may derive information 32 about a functional state of the sensing device 10, for example a probability of a malfunctioning or a loss of performance of the sensing device 10. Optionally, sensing device 10 may further perform a maintenance step 46 of deriving and/or issuing a recommendation for an action based on the information 32 about the functional state. The recommendation may, for example, indicate to replace or to update the sensing device 10.

FIG. 2 illustrates an example of a sensing device 10 according to an example of the present disclosure. The sensing device 10 according to FIG. 2 may optionally be part of the sensor network 8 of FIG. 1a. That is, the sensing devices 10 of FIG. 2 may optionally correspond to the sensing device 10 as explained with respect to FIG. 1, however, it is pointed out that the sensing device 10 of FIG. 2 may be implemented differently from the sensing devices 10 described in FIG. 1a and independently from the sensor network 8.

The sensing device 10 comprises a measurement module 12, which is configured for providing a sequence of measurement values 13 in dependence on an environmental parameter. For example, the measurement module may sense the environmental parameter by means of one or more sensing units. The sensing device 10 further comprises a communication module 14. The communication module 14 communicates with at least one further sensing device 10'. The further sensing device 10' is shown in FIG. 2 using dashed lines, indicating that the sensing device 10 may be implemented independently from the further sensing device 10'. The sensing device 10 further comprises a functional analysis module 16, for example a signal processor, configured for using at least one neural network for determining at least one temporal feature 23 on the basis of the sequence of measurement values 13. The functional analysis module 16 further uses the at least one neural network for determining, on the basis of the temporal feature 23 and on the basis of at least one further temporal feature 23' provided by the further sensing device 10', information 32 about a functional state of the measurement module 12.

According to the example of FIG. 2, the sensing device 10, e.g. the function analysis module 16, comprises a first stage 22 for determining the at least one temporal feature 23, and a second stage 26 for determining the information 32 about the functional state. According to some examples, the first stage 22 and the second stage 26 are both part of the at least one neural network, that is, the neural network may be represented by the first stage 22 and the second stage 26. According to alternative examples, the first stage 22 is implemented as a neural network, i.e. the at least one neural network, and the second stage 26 is a second neural network.

It is noted, that in some examples, the at least one neural network may be implemented using a machine learning model other than a neural network, or alternatively, the first stage 22 for determining the at least one temporal feature 23 is implemented as neural network, and the second stage 26 is implemented using a machine learning model other than a neural network.

For example, the sequence of measurement values 13 may represent a temporal evolution of the environmental parameter. In other words, the sequence of measurement values 13 may be a temporal sequence of measurement values acquired during a temporal sequence of measurements of the environmental parameter. Consequently, a change of a functional state of the measurement module, e.g., of a sensing unit of the measurement module, the sensing unit being for sensing the environmental parameter, over time, which may occur, for example, due to a malfunction of the sensing unit or the measurement module or a performance loss such as a degradation of the sensing unit, may affect the sequence of measurement values 13. Consequently, the sequence of measurement values 13 may give a hint on a malfunction or a performance loss of the measurement module 12. However, at the same time, the sequence of measurement values 13 may be subject to a change of the environmental parameter, so that it may be difficult to differentiate between a change of the functional state of the measurement module 12 and the change of the environmental parameter. The second stage 26 of the functional analysis module 16 combines the temporal feature 23, which is determined from the measurement values 13, with one or more further temporal features 23' of the further sensing device 10'.

As described with respect to FIG. 1, the further sensing device 10' may be located in the proximity of the sensing device 10. The further sensing device 10 may be implemented correspondingly to the sensing device 10. That is, the further temporal feature 23' may be determined based on a sequence of measurement values of the further sensing device 10'. For example, the further temporal feature 23' may be determined from measurement values measured during the same time period as the measurement values 13' based on which the temporal feature 23 is determined. Consequently, as the further sensing device 10' may be located in the proximity of the sensing device 10, and the further temporal feature 23' may be based on a similar or same time period as the temporal feature 23, combining the temporal feature 23 and the further temporal feature 23' may allow for differentiating a change of the environmental parameter from a change of the functional state of the measurement module 12. The combination of the temporal feature 23 with the further temporal feature 23', and optionally further temporal features of further sensing devices, consequently allows for a reliable determination of the information 32 about the functional state. Communication between the sensing device 10 and the further sensing device 10', together with the implementation of the function analysis module 16 in the sensing device 10 may allow the sensing device 10 to determine the information 32 about the functional state independently of a server. That is, the sensing device 10 may determine the information about the functional state on the edge. Thus, the information 32 about the functional state may be determined reliably, even if a connectivity of the sensing device 10 to a network may be limited or even non-existing. As the sensing device 10 may determine the information 32 about the functional state on the basis of temporal feature 23 and the further temporal feature 23' of one or more further sensing devices 10' which are currently in range, or which are currently able to communicate with the sensing device 10, the determination of the information 32 of the functional state is particularly stable against connectivity problems, as the number of further sensing devices 10' the further temporal features 23' of which are considered in the determination of the information 32 of the functional state, may be flexibly adapted to the current connectivity state. Further, communicating the further temporal feature 23' to the sensing device 10, e.g. instead of transmitting the measurement values themselves, allows for a small data volume to be transmitted for transmitting information about the sequence of measurement values of the further sensing device 10'. As the temporal feature 23' is used for the determination of the information 32 of the functional state of the sensing device 10, and may further be provided to the further sensing device 10', which on its behalf may determine information about a functional state of the further sensing device 10', the processed information about the sequence of measurement values, namely the temporal feature 23', may be used by multiple sensing devices, namely the sensing device 10 and one or more further sensing devices 10', for determining respective information 32 about their functional state. Thus, determining the temporal feature 23 in the first stage 22, and subsequently processing the temporal feature 23 in the second stage 26 provides for a high computational efficiency in a sensor network. In other words, it is possible to reuse the temporal feature 23 for the different node quality evaluations and compress the amount of data that has to be transmitted, thereby saving computational resources on the sensor itself. Therefore, the technique is particularly beneficial for low-cost sensors and edge computing scenarios. In other words, the disclosed concept may be particularly beneficial for fault detection in edge-computing scenarios for environmental sensors.

For example, each of the sensing devices 10 of FIG. 1a may be implemented according to the example of FIG. 2. In other words, the sensing network 8 may continuously self-evaluates each node locally on defects, e.g. such as those described with respect to FIG. 8.

According to examples, the first stage 22 uses a recurrent neural network for determining the temporal feature 23 on the basis of the sequence of measurement values 13. In alternative examples, the first stage 22 uses a feed-forward neural network for determining the temporal feature 23. A recurrent neural network may exhibit feedback between layers of the network, and may therefore be particularly suitable for evaluating temporal characteristics of the sequence of measurement values. Feed-forward neural networks may have particularly low hardware requirements.

For example, first stage 22 may receive the sequence of measurement values 13 as input features of the neural network. Alternatively, the functional analysis module 16 may determine one or more input features for the neural network of the first stage 22 on the basis of the sequence of measurement values 13. In examples, the input features for the neural network of the first stage 22 include the measurement values 13 and one or more parameters derived from the measurement values 13, such as, for each of the measurement values 13, a derivative and/or a second derivative of a measurement signal which is represented by the measurement values 13 and/or an energy vector. The one or more parameters may be provided by the measurement module 12, or may be determined by the functional analysis module 16 on the basis of the measurement values 13.

In examples, the measurement module 12 may provide one or more further sequences of measurement values, e.g. one sequence for each of a plurality of sensing units of the measurement module 12. According to these examples, the first stage 22 may determine a plurality of temporal features 23 on the basis of the sequence of measurement values 13 and the one or more further sequences of measurement values.

In examples, the first stage 22 may determine, on the basis of the sequence of measurement values 13, and optionally on the basis of one or more further sequences of measurement values, a plurality of temporal features 23. The plurality of temporal features 23 may be provided to the second stage 26 for the determination of the information 32 of the functional state.

In other words, the neural network of the first stage 22 may receive, as input features, the sequence of measurement values 13 and optionally one or more further sequence of measurement values 13 and/or one or more sequences of further parameters determined from the sequence of measurement values 13 or a further sequence of measurement values. The second stage 26 may determine the one or more temporal features 23 as output features of the neural network of the first stage 22.

The second stage 26 may determine the information 32 about the functional state on the basis of the temporal feature 23 and optionally additional temporal features 23 determined by the first stage 22. Further, the second stage 26 may receive the further temporal feature 23' of the further sensing device 10' and may receive additional temporal features 23' of additional further sensing devices 10'. For example, as illustrated with respect to FIG. 1b, the sensing device 10 may receive a further temporal feature 23' from each of a plurality of further sensing devices 10' which are within range for communicating with the sensing device 10. Thus, the second stage 26 may use respective further temporal features 23' of the further sensing devices 10' for the determination of the information 32 of the functional state.

According to examples, the second stage 26 uses spatial information about the sensing device 10 and the further sensing device 10' for determining the information 32 about the functional state.

Based on the spatial information, the second stage 26 may estimate an extent, to which the temporal features 23, 23' of the sensing device 10 and the further sensing device 10' correlate. Thus, the usage of spatial information may increase an accuracy and/or a reliability of the information 32 about the functional state.

For example, the spatial information includes information about a relative spatial arrangement of the sensing device 10 and the one or more further sensing devices 10' by which the sensing device 10 is provided with respective temporal features 23'. The spatial information may include a distance between the sensing device 10 and the further sensing device 10' and/or a location of the sensing device 10 and the further sensing device 10'. Thus, the spatial information may not only be indicative of a relative arrangement between the sensing device 10 and the further sensing device 10', but also of a relative arrangement between two of the further sensing devices 10'. In some examples, the spatial information may include information about wind speed and/or wind direction, which may be beneficial in case that the sensing device is gas sensing device. In the example of gas sensing devices, in which the environmental parameter is a concentration of a target gas, the spatial information may include information about the presence or the concentration of one or more gases different from the target gas.

For example, the communication module 14 may receive parts or all of the spatial information, in particular information about wind or other gases. The spatial information, or parts thereof, may be provided by the one or more further sensing devices 10' and/or one or more further devices communicating with the sensing device 10, the one or more further devices not necessarily being sensing devices.

According to examples, the second stage 26 may use a neural network, for example a graph neural network, for determining the information about the functional state on the basis of the temporal feature 23, the further temporal feature 23', and the spatial information.

A graph neural network may be particularly suitable for comparing the temporal feature 23 and the further temporal feature 10' which may correlate according to the spatial relation between the sensing device 10 and the further sensing device 10'. In particular, in case of a high number of further sensing devices 10', the graph neural network (GNN) may provide an efficient way of resolving the mutual spatial correlations between the sensing device 10 and the further sensing devices 10'. A GNN may reflect the environment in which environmental sensors are ought to operate. It may make environmental effects and geographical structures apparent, for instance by implementing wind speed as an edge weighting factor, which cannot, or hardly, be taken account of in a simple RNN structure.

According to examples, the sequence of measurement values 13 represents a temporal evolution of the environmental parameter over a time period of at least one hour, or at least five hours.

The longer the sequence of measurement values 13, the longer the time interval represented by the temporal feature 23. The temporal feature 23 representing a long time period may provide for an accurate determination of the functional state of the measurement module 12. Further, the temporal feature 23 representing a long time period allows for providing measurement information of a long time period to the further sensing devices 10' with particularly low data volume. For example, a time period of at least one hour or at least five hours may be particularly beneficial for detecting a sensitivity loss due to saturation of the sensing surface of a chemoresistive gas sensing device.

According to examples, the communication module 14 is configured for providing the temporal feature 23 for one or further sensing devices.

For example, the communication module 14 may broadcast the temporal feature 23, so that one or more further sensing devices 10' in the range of sensing device 10 may receive the temporal feature 23. In other examples, the sensing device 10 may establish a connection to the further sensing device 10' and provide the further sensing device 10' with the temporal feature 23 via the established connection. Providing the temporal feature 23 to the further sensing device 10' allows the further sensing device 10' for using the temporal feature for the determination of its functional state.

According to examples, the communication module 14 is configured for receiving the further temporal feature 23' directly from the further sensing device, that is, for example, independently of a server.

Direct communication between the sensing device 10 and the further sensing device 10' allows for a determination of the information 32 of the functional state independently of a connection to a server. Further, a direct communication between sensing devices reduces traffic volume, as information does not necessarily have to be distributed by a server.

For example, the communication module 14 may communicate with a further sensing device 10' via a short-range wireless communication interface, such as Bluetooth, so as to receive the further temporal feature 23'.

Using a short-range communication interface has the advantage that the sensing device 10 may only receive a further temporal feature 23' from a further sensing device 10' which is in the proximity of the sensing device 10. Thus, the further temporal features 23' to be used for the determination of the functional state of the sensing device 10 do not necessarily have to be preselected by distance between the sensing device 10 and the one or more further sensing devices 10', but the sensing device 10 may assume that the temporal feature 23' originates from a further sensing device 10' within its proximity. In some examples, the sensing device 10 may derive a distance between sensing device 10 and the further sensing device 10' from a signal strength of a connection between the sensing device 10 and the further sensing device 10' and use this distance as spatial information for the determination of the functional state.

For example, the communication module 14 of the sensing device 10 may communicate with the further sensing device 10' via Bluetooth of class 1, which may be particularly advantageous for outdoor applications, for example when aiming for dense city networks. That is, the sensor network 8 of FIG. 1a may comprise a plurality of sensing units 10 distributed over a city, wherein distances between the sensing units may be short enough for communicating via Bluetooth class 1. For even shorter distances, such as networks, which are installed indoor, for example for room air quality scenarios, Bluetooth class 2 connectivity may provide a more energy efficient solution.

According to examples, the communication module 14 may obtain information about a location of a further sensing device 10'. The communication module 14 may provide the information about the location as part of the spatial information to the second stage 26.

For example, the further sensing device 10' may provide information on its location to the sensing device 10. The information about the location may be based, for example, on satellite-based positioning methods, such as GPS. In some examples, positions of the sensing device 10 and the further sensing devices 10' may be determined on the basis of distance measurements between the sensing device 10 and the one or more further sensing devices 10'.

According to examples, the information 32 about the functional state indicates, for each of one or more fault types of the measurement module 12, a certainty (or a probability) that the measurement module 12 experiences a fault of the fault type.

For example, the information 32 about the functional state may comprise a certainty value for each of the fault types, the certainty value indicating a certainty that the measurement module 12 experiences the fault of the fault type. Alternatively, the information 32 may indicate the certainty for the fault of the fault type by means of indicating a certainty class. In examples, the functional analysis module 16 may determine the certainty class based on a certainty determined by the neural network of the second stage 26. Thus, the neural network of the second stage 26 may determine, as output features, respective probabilities for one or more fault types.

For example, the sensing device 10 may decide, based on the information 32 about the functional state, whether to perform a maintenance action, such as providing a failure alert, or deactivating, partially or entirely, the measurement module 12, performing a recalibration, a software update, and/or a measure for recovering sensor hardware for determining the measurement values.

According to examples, the function analysis module 16 is configured for initiating a maintenance action in dependence on the information 32 about the functional state, e.g. by initiating maintenance step 46 (cf. FIG. 1c). An exemplary maintenance step is described with respect to FIG. 10.

According to examples, the sensing device 10 may provide the information 32 about the functional state over the communication module 14, for example to a server. Thus, the information 32 about the functional state may be used for monitoring the performance of the deployed sensors over time and identifying potential malfunctioning nodes giving concrete indications on how to replace/repair faulty sensors. In other words, the maintenance step 46 may be performed by the sensing device 10 itself, or may be performed on behalf of a further device communicating with a sensing device 10.

Figure 3:
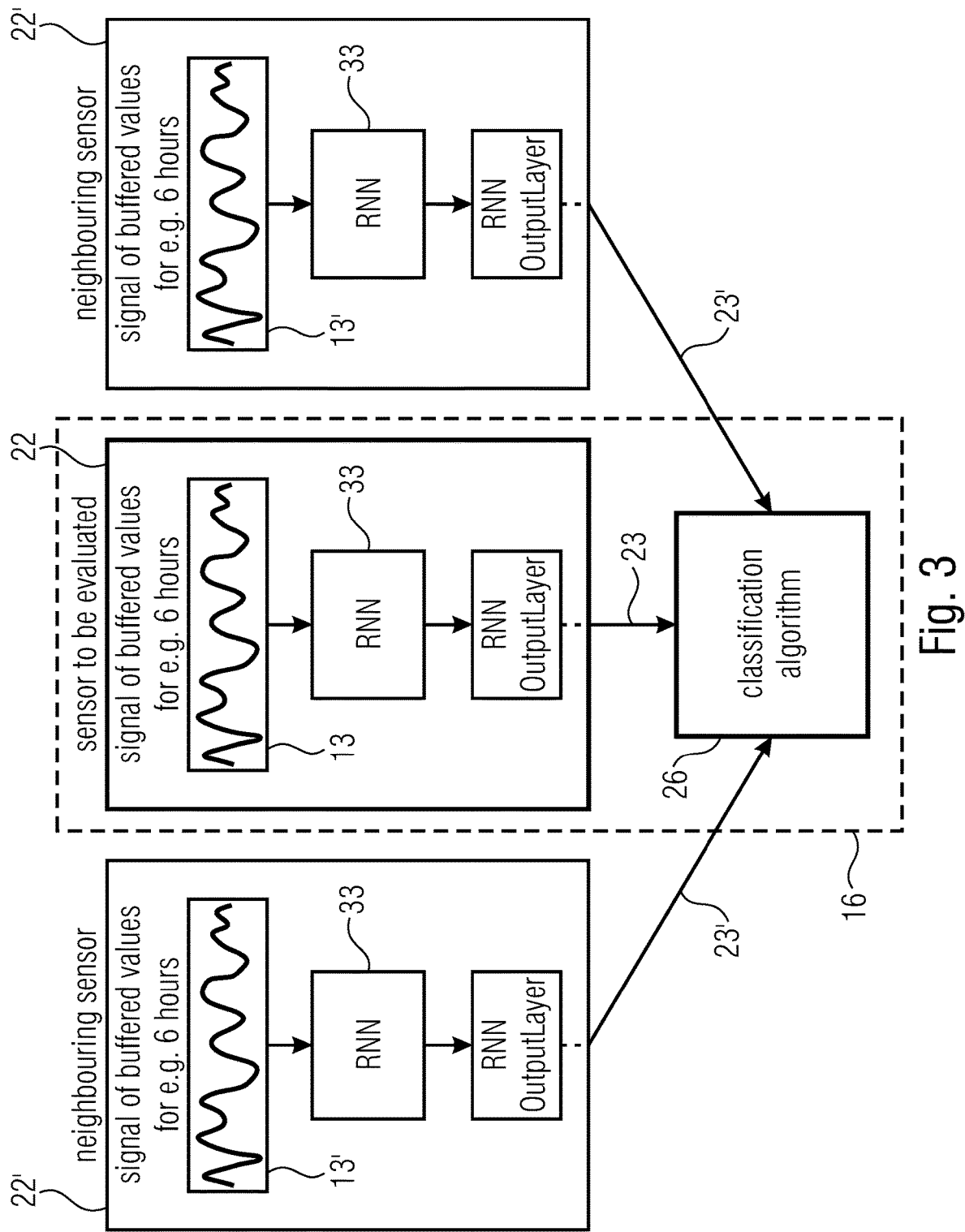
FIG. 3 illustrates an example of an operation scheme for the function analysis module.

FIG. 3 illustrates an operation scheme for the functional analysis module 16, as it may optionally be implemented by the sensing device 10 of FIG. 2. According to the operation scheme of FIG. 3, on each sensor, e.g., the sensing device 10, data of the measurement module, i.e., measured values of the measurement module 12, buffered over a certain time frame, e.g., six hours, is processed by a recurrent neural network 33 (RNN) of the first stage 22. The RNN may be trained to extract temporal features inside of the measurement values 13. The temporal features 23 may be calculated for each sensor individually, directly on each sensor. That is, the sensing device 10 determines temporal features 23, e.g. using the first stage 22, and each of further sensing devices 10' determines respective further temporal features 23' by means of a respective first stage 22' of the further sensing device 10'. For example, the temporal features 23 and the further temporal features 23' may be calculated simultaneously, for example when a network checkup is started. For example, a network checkup may be initiated by one of the sensing devices or by a higher-level instance such as a server. In a further step, for the assessment of one individual sensing device, e.g., the sensing device 10, the temporal features 23 of this sensing device 10 are combined with the temporal features 23' of the neighboring or surrounding sensor devices, provided to the sensing device 10 by a data exchange. The temporal features 23 and the further temporal features 23' are input to a classification step, which according to the scheme of FIG. 3 is performed by the second stage 26. E.g., each of fault types of the measurement module 12, as described with respect to FIG. 2, may be associated with a class of a classification algorithm performed by the second stage, e.g. by means of a GNN. The classification step is calculated on the sensor, which is assessed, i.e., the sensing device 10. The output of the classification step, e.g. the information 32 about the functional state, may be used to see if the sensing device 10 works or shows a defect. A key advantage of the disclosed concept is that the temporal features 23, 23' can be reused in the assessment of a different sensor, e.g., one of the further sensing devices 10', because it is determined on the sensor level, that is, for example, determined on the basis of measurement values of a single sensing device. In contrast, the classification model of the second stage 26 may act upon different geographically distributed sensing devices, each of the sensing devices having a different set of neighboring sensing devices.

Figure 4:
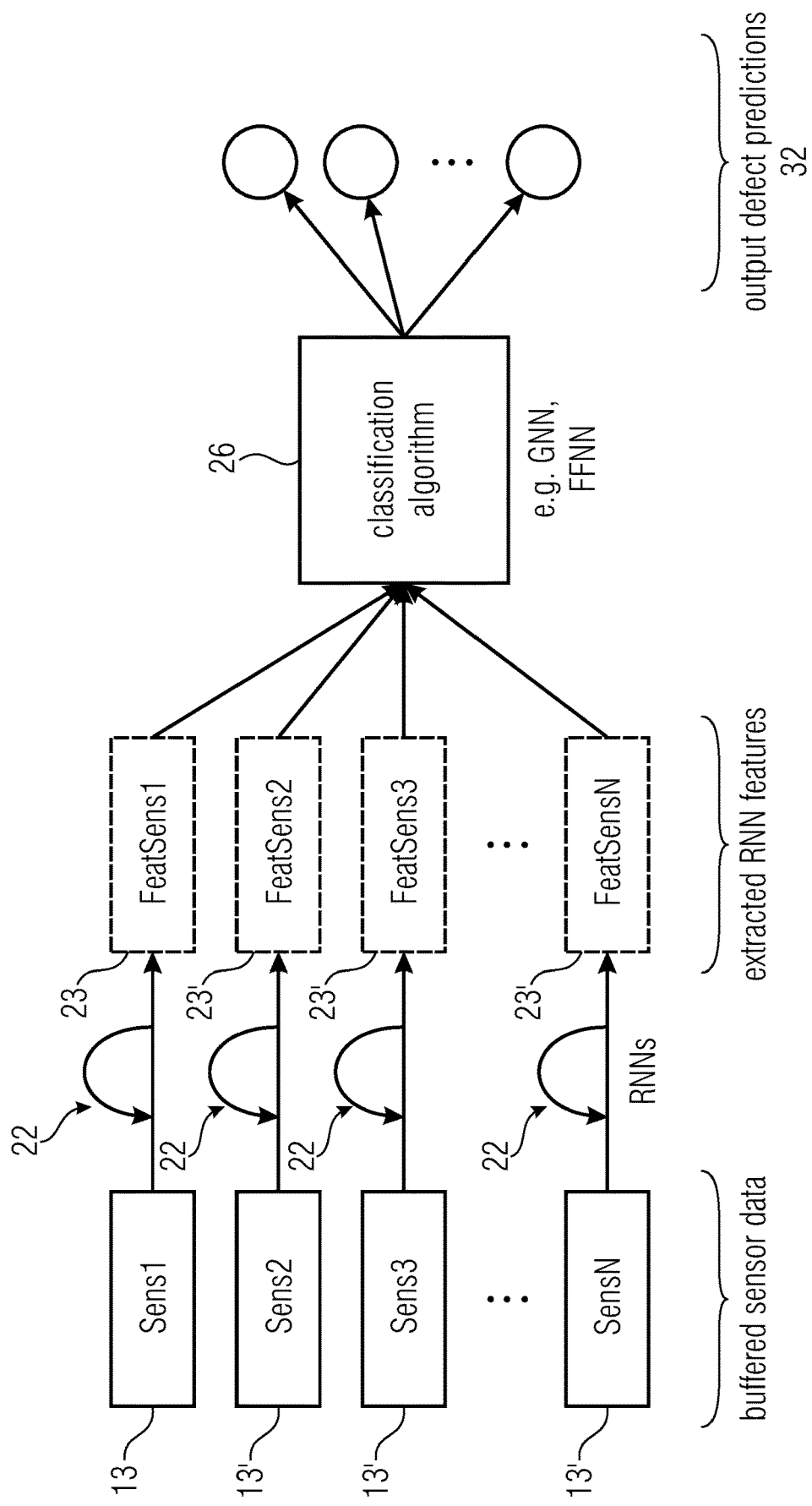
FIG. 4 shows a block diagram for an example of the function analysis module.

FIG. 4 shows a block diagram of a sensor fault detection method as it may be performed by examples of the function analysis module 16. The sensor fault detection method comprises a data gathering block (not shown). In the data gathering block, each sensing device of a plurality of sensing devices buffers sensor data 13, 13' over a predefined time frame, for example one hour or six hours. The time frame may be selected according to a desired quality classification frequency and latency. For keeping memory requirements low, the buffered sensor data, i.e. the sequence of measurement values 13, does not necessarily include all measurement values measured by the measurement module 12, but may include a subset of measurement values measured by the measurement module 12. That is, the sequence of measurement values 13 may include subsamples of the measured values. For example, the sequence of measurement value may have a sampling rate of one minute. The measurement values of the sequence of measurement values 13 may, for example, be determined by averaging measurement values over a sampling period, e.g. one minute.

The plurality of sensing devices may comprise a number of N sensing devices and may comprise a first sensing device buffering sensor data 13, e.g., the sensing device 10 for which the functional state is to be determined, and a number of N−1 further sensing devices 10', each of which buffering sensor data 13'. Each of the sensing devices 13, 13' may execute a temporal feature extraction block 22, e.g., the second stage 26 of the functional analysis module. The feature extraction block extracts temporal features from the measurement values 13, 13' of the respective sensing device 10, 10'. In other words, the temporal feature extraction block may narrow the gathered data 13, 13' down to features 23, 23' that carry defect related information. Preferably, the temporal feature extraction is accomplished by using recurrent neural networks, for example a simple gated recurrent unit (GRU). The temporal feature extraction block is performed by each of the sensing devices 10, 10' individually. The temporal feature extraction block may be part of the data processing for a classification task for classifying a functional state of the sensing device 10, for which the sensor for detection method is performed. The temporal feature extraction block may use, for each of the sensing devices 10, 10', a recurrent feature vector, that is the temporal features 23, 23'. The temporal features 23. 23' are subsequently combined across different geographically distributed sensing devices 10, 10' by a classification algorithm, e.g., the second stage 26 as explained with respect to FIG. 2. The classification algorithm may preferably be implemented as a graph neural network (GNN) dedicated to the task of classifying the sensor quality state for an evaluation instance. That is, the second stage 26 may be implemented as classification algorithm, providing, as the information 32 about the functional state, a prediction, which is a vector provided in the output layer of the classification algorithm, containing estimates over different fault certainties. Optionally, the prediction, that is the information 32 about the functional state, can then lead to actions on the sensor network, e.g., the sensor network 8, and/or the single nodes, i.e., the single sensing devices 10, 10'.

Figure 5A:
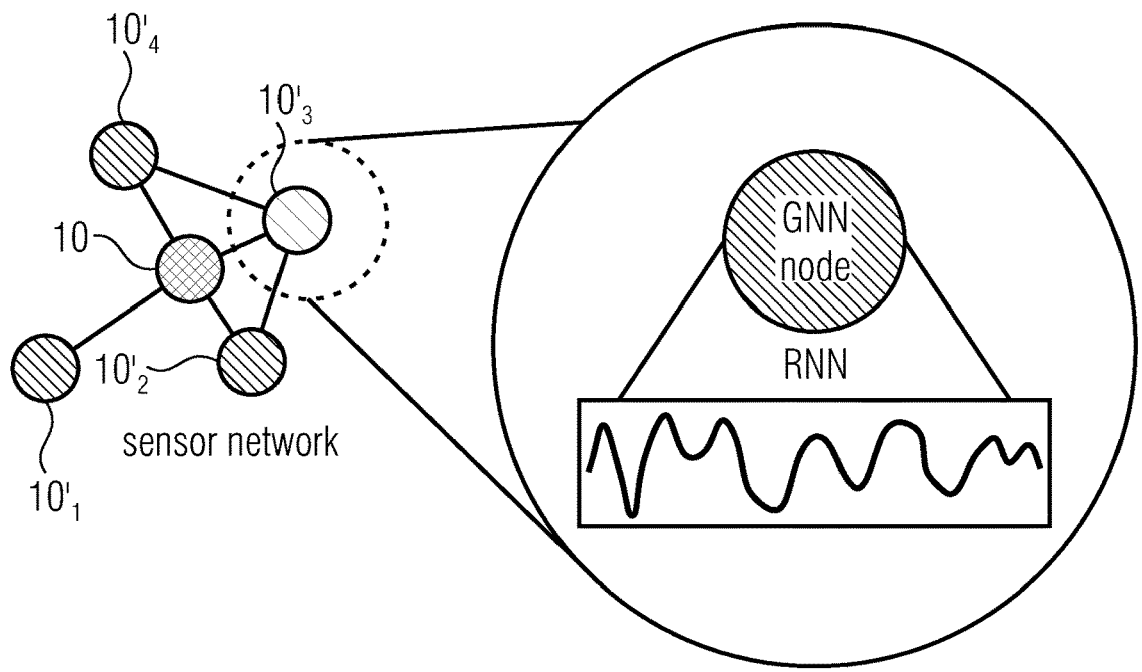
FIGS. 5a-5c show another illustration of an example of an operation scheme of the sensing device.
Figure 5B:
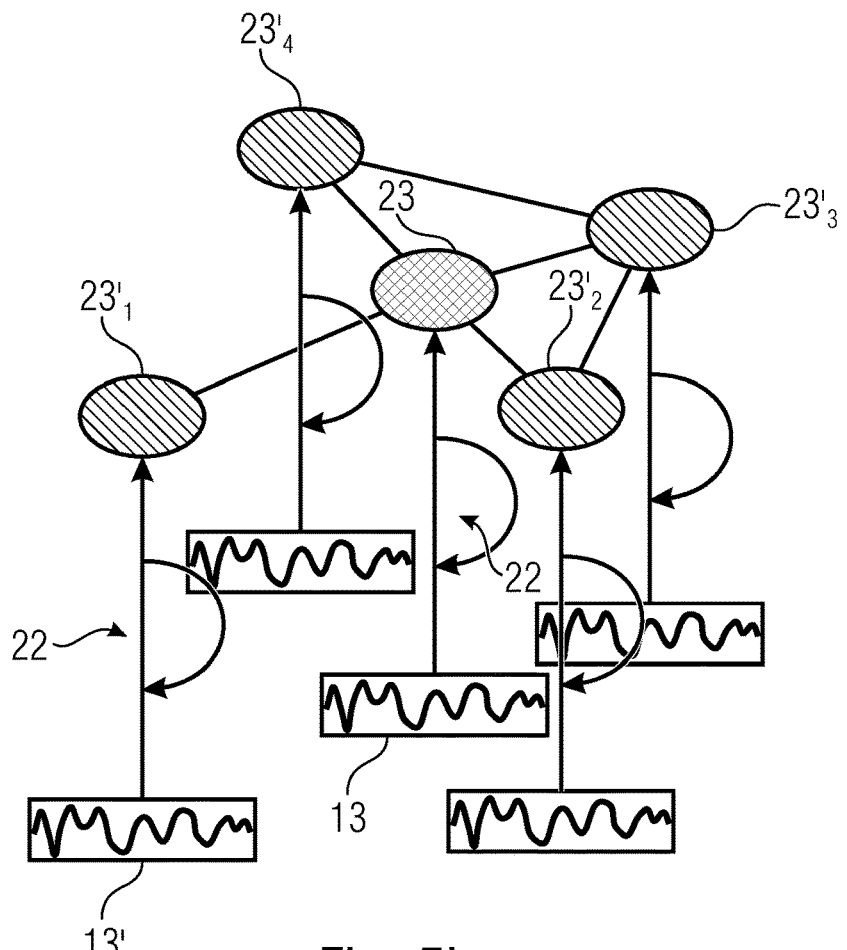
Figure 5C:
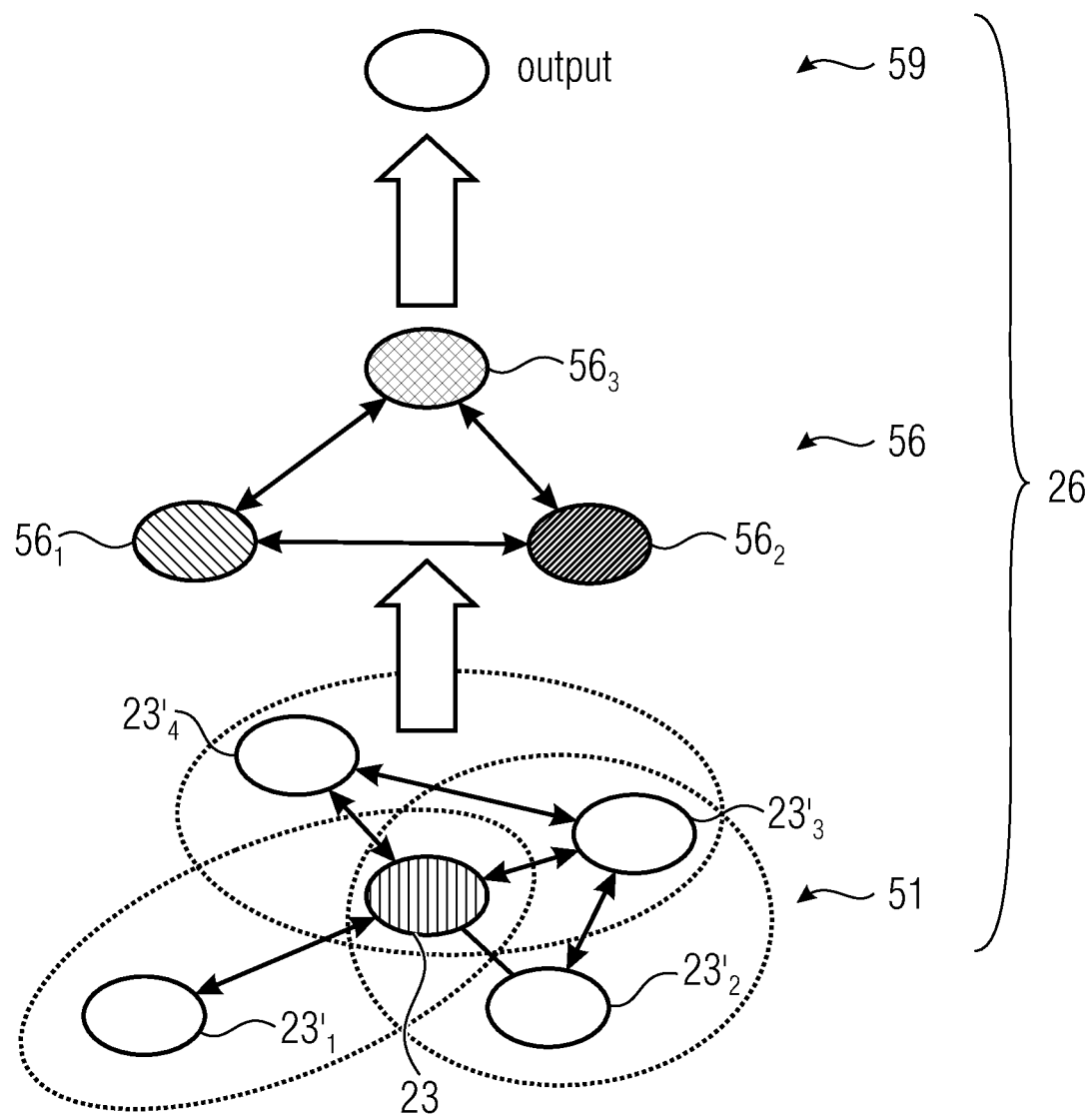

FIG. 5 illustrates an example of an operation scheme for determining the information 32 about the functional state of the sensing device 10, as may be performed by the sensing device 10 of FIG. 2. For example, the operation scheme of FIG. 5 may optionally be in accordance with the operation schemes illustrated in FIG. 3 and FIG. 4. According to the example of FIG. 5, the sensing device 10, the functional state of which is to be analyzed, has four neighboring sensing units 10', e.g., four further sensing units 10' within communication range, namely first to fourth further sensing devices $10'_1$ to $10'_4$, as illustrated in FIG. 5a. As illustrated by means of FIG. 5b, each of the sensing units 10 and the further sensing units 10' use a respective second stage 22, e.g., an RNN, for deriving respective temporal features 23, 23' on the basis of respective measurement values 13, 13'. Temporal features $23'_1, 23'_2, 23'_3, 23'_4$ of the further sensing units $10'_1, 10'_2, 10'_3, 10'_4$ are provided as input features 51 to the second stage 26 of the sensing device 10, as illustrated in FIG. 5c. The second stage 26 may, by means of an intermediate layer 55 of the second stage 26, e.g., a layer of a GNN, correlate or compare or combine the temporal features of neighboring sensing units. For example, as illustrated in FIG. 5c, the second stage 26 may determine a first intermediate feature $56_1$ by a combination of the temporal features 23 of the sensing device 10 and the temporal features $23'_1$, a second intermediate feature $56_1$ by a combination of the temporal features 23, the further temporal features $23'_1$ and the further temporal features $23'_3$, and a third intermediate feature $56_3$ by combination of the temporal features 23, the further temporal features $23'_3$ and the further temporal features $23'_4$. It is pointed out that further intermediate features may be determined by a combination of further temporal features irrespective of the temporal features 23 of the sensing device 10 for which the functional state is to be determined. In other words, the GNN structure may not only take edges between the evaluated node and the neighbors but also the edges between the neighbors into account, which might make the prediction more stable to environmental conditions.

The GNN of the second stage 26 may determine, on the basis of the intermediate features 56, output features 59. It is noted that the second stage 26 may comprise further intermediate layers, which are not shown in FIG. 5c. The information 32 about the functional state may correspond to the output features 59 or may be derived from the output features 59. As the second stage 26 may consider spatial correlation, or an arrangement of the sensing units 10, 10', each of the sensing units 10, 10' may be regarded as a node of a GNN of the second stage 26, as indicated by the zoom-in of FIG. 5a.

In other words, FIG. 5 illustrates how both the temporal and spatial properties of measurement signals measured by the sensing units 10, 10' in the neural network, such as the neural network 8 of FIG. 1, may be exploited for reliably detecting the presence of a defect of the sensing device 10 and for classifying the defect. The mapping of measurement values of the measurement signals of the sensing units, which may serve as raw input features, collected over a given temporal window into (embedded) temporal features 23, 23' via a RNN may account for the history of the sensor responses of the sensing units 10, 10'. As shown in FIG. 5b, this mapping is carried out at each sensing unit individually. As illustrated by means of FIG. 5c, the embedded temporal features 23, 23' collected across neighboring nodes are subsequently fed to the center node, i.e., the sensing device 10 for which the information about the functional state is to be determined. At the sensing device 10, the spatial properties of the network are leveraged, e.g., by applying a GNN to the incoming signals, that is the temporal features of the sensing device 10 and the neighboring sensing units 10'. The GNN may perform graph convolutions in space, as illustrated by means of FIG. 5c. For example, the different relations between the nodes are used by the GNN, for instance by message passing to evaluate the center node, that is the sensing device 10. Principles of message passing and graph convolutions are illustrated by means of FIG. 5c.

Figure 6:
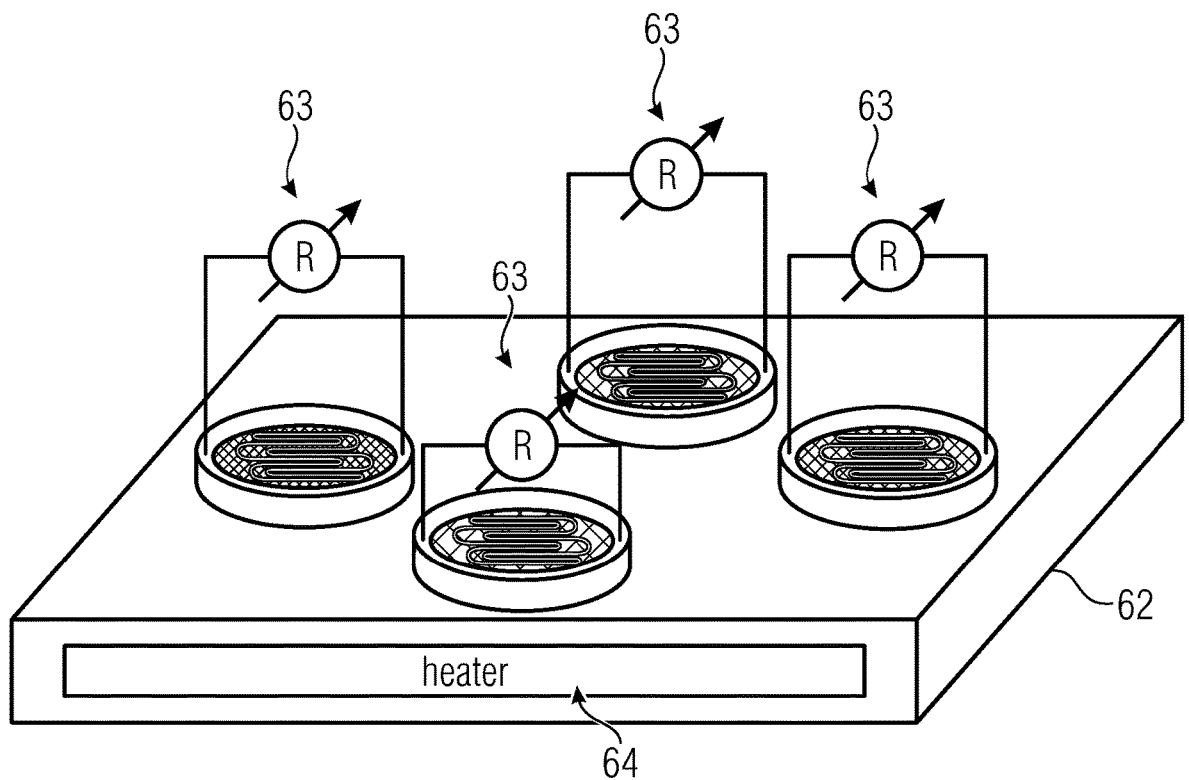
FIG. 6 illustrates an example of a measurement module for sensing a target gas.

FIG. 6 illustrates a measurement module 62 according to an example. The measurement module 62 comprises a plurality of sensing units 63, each of which is sensitive to a target gas out of a plurality of target gasses. For example, each of the sensing units may be sensitive to a different target gas. Alternatively, one or more of the sensing units 63 may be sensitive to the same target gas, so as to provide redundant measurement signals. Also, it should be noted that one of the sensing units 63 may be sensitive to multiple target gasses, wherein the sensitivity of the sensing unit 63 may be different for the different target gasses. The sensing units 63 may provide respective measurements signals in dependence on concentrations of the target gases to which the sensing units 63 are sensitive.

As shown in FIG. 6, but optionally, the measurement module 62 may comprise a heater 64, or an individual heater for each of the sensing units 63. During exposure of a sensing unit 63 to a gas, e.g., the target gas, molecules of the gas may adsorb at a sensing surface of the sensing unit. Heating the sensing surface of the sensing unit 63 may support a desorption of the adsorbed gas molecules, preventing a loss of sensitivity of the sensing unit 63.

Figure 7:
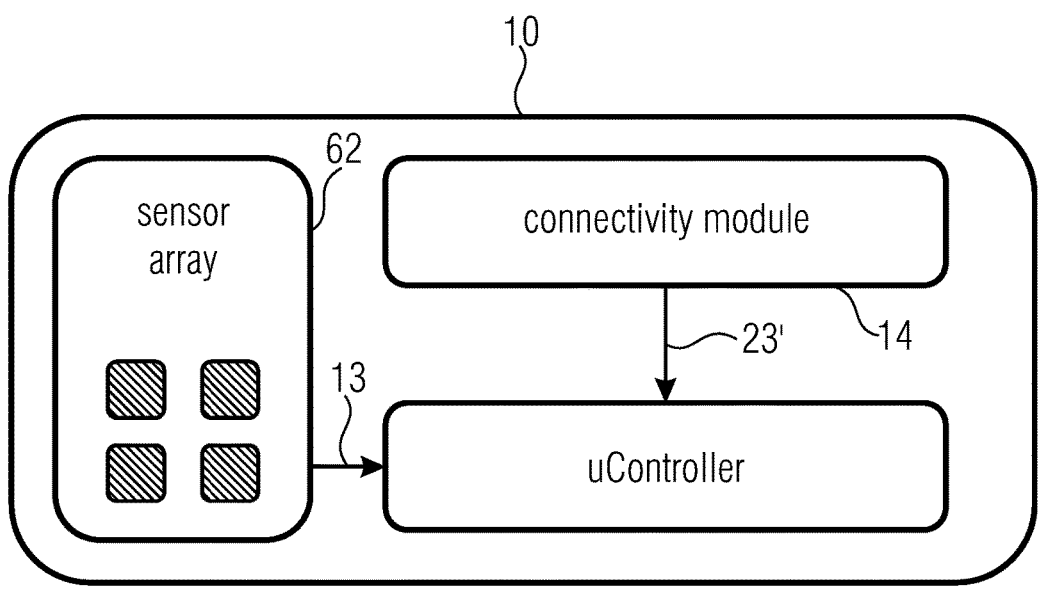
FIG. 7 illustrates an example of a gas sensing device.
Figure 8A:
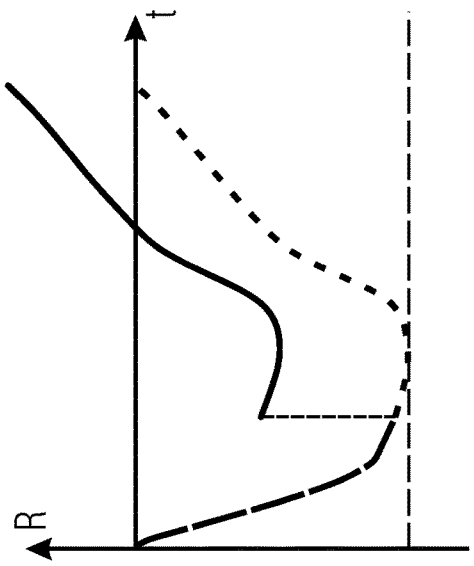
FIGS. 8a-8d show examples of several fault types of a sensing devices.
Figure 8B:
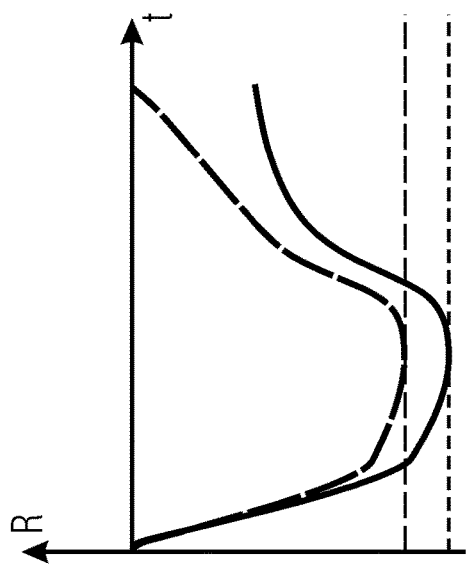
Figure 8C:
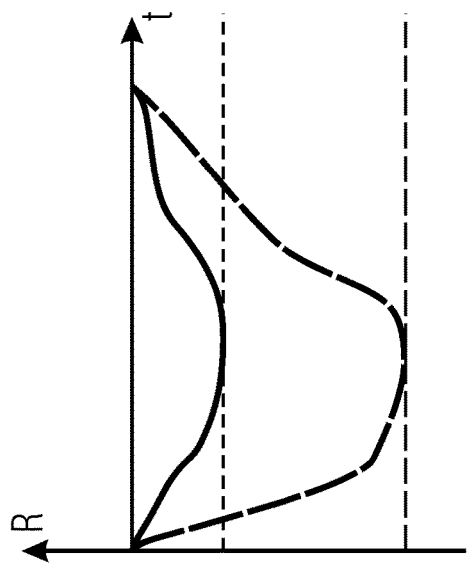
Figure 8D:
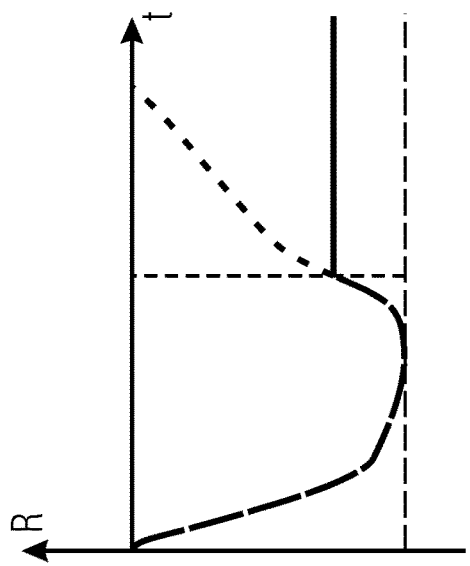

FIG. 7 illustrates an example of the sensing device 10, e.g. as described with respect to FIGS. 1 to 5, the measurement module 12 of which corresponds to the measurement module 62. Thus, according to examples of the sensing device 10, the environmental parameter is a concentration of a target gas, and the measurement module comprises a plurality of sensing units 63, each of which is sensitive to a target gas out of a plurality of target gasses. The measurement module 62 may be configured for providing, on the basis of respective measurement signals of the sensing units 63, respective sequences of measurement values 13 of the sensing units 63. Accordingly, the function analysis module 16 may be configured for determining a plurality of temporal features 23 on the basis of the sequence of measurement values 13. Further, the function analysis module 16 may determine, on the basis of the temporal features 23, and on the basis of further temporal features 23' provided by the further sensing device 10', the information 32 about the functional state of the measurement module. According to these examples, the information 32 about the functional state of the measurement module 62 indicates, for at least one or each of the sensing units 63, a certainty (or a probability) that the sensing unit 63 experiences a fault.

In other words, the sensing device 10 may comprise a sensor array 62 interacting with the air and the gases to be analyzed, a micro-controller module 16 for the conditioning and signal processing of the sensor raw data and a connectivity module 14, which ensures the connectivity of the sensor network.

For example, the granularity of the output vector of the GNN as explained with respect to FIG. 4 and FIG. 5, i.e., the second stage 26, may be matched to the number of sensing units 63 of the measurement module 62. That is, the information 32 about the functional state may indicate for each of the sensing units 63 individually, if the respective sensing unit 63 is defect. By doing this, if a single sensor field 63 is found to be faulty, a possible repair action would correspond to silencing of, e.g., deactivating, that specific sensing unit 63, e.g., via software, using a reduced model for determining the concentration of the target gas from the measurement signals of the sensing units 63, the reduced model disregarding the deactivated sensing unit. Alternatively, if a second sensing unit, which is a redundant sensing unit, is available, the repair action could be an activation of the backup sensing unit.

According to examples, the sensing units 63 are carbon-based chemo resistive gas sensing units having a sensing layer, which comprises a carbon-based material such as graphene. In other words, in examples, the measurement module 62 may comprise a graphene multi gas sensor array including a plurality, e.g. a number of four, graphene-based sensors, where the base material is functionalized with different chemicals (e.g., Pd, Pt, and $M_nO_2$) for dissimilar selectivity, e.g. selectivity for different target gases. The interaction between graphene sheets and absorbed gas analytes would influence the electronic structure of the material, resulting in altered charge carrier concentrations and changed electrical conductances. Meanwhile, due to different sensitivity towards various gas molecules, resistances of the sensors also change in disparate patterns, making it possible to analyze complicated gas mixtures with one single sensor array. Each sensor in the array has a heating element whose temperature is being pulsed between a recover phase temperature and a sense phase temperature.

FIG. 8 shows measurement signals illustrating different types of defects, which may occur in the sensing unit 63, for example in a graphene based gas sensing unit. The measurement signals of FIG. 8 illustrate sensor responses for a single concentration pulse. One fault type may be a low sensitivity or no sensitivity of the measurement signal to concentration changes, as shown in FIG. 8a. Another fault type may be signal jumps, as shown in FIG. 8b. FIG. 8c shows another fault type in which the sensor stops running. FIG. 8d illustrates a sensor response in case of another fault type in which the heater, e.g., heater 64 as explained with respect to FIG. 6, stops working or gets weaker, which leads to slower recovery and dynamics of the sensor.

According to examples of the present disclosure, the function analysis module 16 may differentiate between different fault types, e.g., the fault types exemplarily described with respect to FIG. 8. The fault types of FIG. 8 may be particularly relevant for carbon based sensing units, but may also apply to other types of sensing units. Also, further fault types may occur, which may be differentiated from the illustrated fault types by means of the disclosed method.

For example, damages or defects can occur, for instance, if the sensing layer has non uniformities of the sensing layer or scratches that are not detected during the wafer-level characterization (e.g., scratches cause during pre-assembly and assembly), or if the MEMS present delamination of the metal lines or broken membranes, or if the bonding wires are damaged or the adhesion of the bond was poor (for instance due to surface contamination).

In such cases, the sensor will either not respond (sensitivity and derivative are lower than the typical noise levels experienced in the lab for a prolonged amount of time) or deliver values which are way above the expected ranges for the concentration ranges and dynamics the sensor has been calibrated for. Similarly, it has been observed that the presence of an interfering background gas can also cause a specific sensor field to react to it more than the other fields and behave in an unexpected way (e.g., saturate or oxidize).

Figure 9:
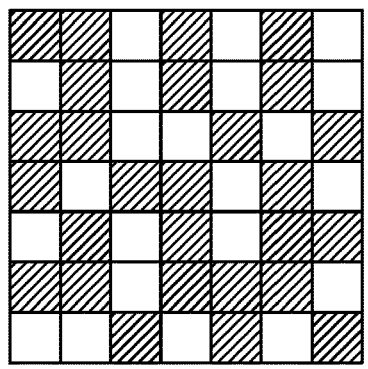
FIG. 9 illustrates an example of a classification scheme for sensor fault evaluation.
Figure 9:
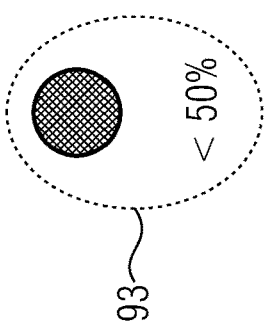
Figure 9:
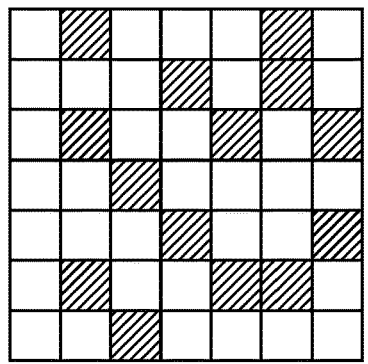
Figure 9:
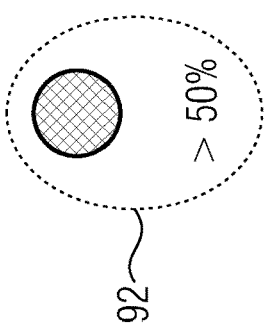
Figure 9:
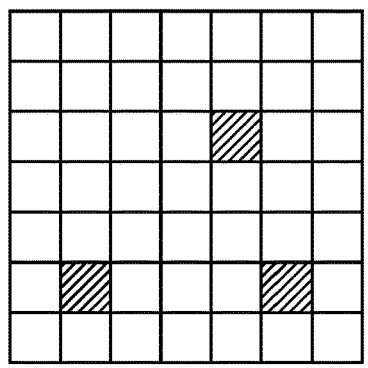
Figure 9:
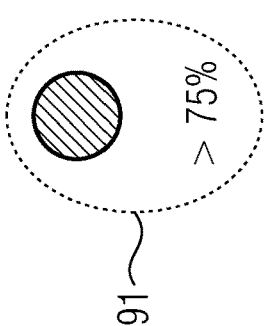
Figure 9:
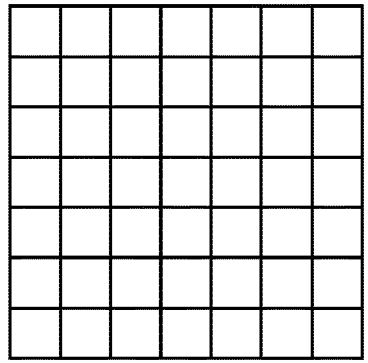
Figure 9:
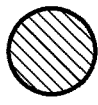

FIG. 9 illustrates a classification scheme for sensor fault evaluation according to an example. As described with respect to FIG. 2 to FIG. 4, the second stage 26 may determine, for each of fault types, which may be represented by respective classes, a certainty for the existence of the respective fault. The certainty may be indicated in terms of categories or states, as explained with respect to FIG. 9 exemplarily for the fault type of a low sensitivity of the sensing unit 63, but may also be applied to different fault types and different implementations of the measurement module 12. According to the classification scheme of FIG. 9, the sensing unit 63 may be attributed to a first state, according to which the sensing unit 63 suffers no or only a few defects of the sensor surface. According to a second-class 92, the sensor surface suffers some damage or aging signs. According to a third state 93, the sensing unit 63 shows a large insensitivity to gasses. The classification may be color-coded, for example, the first state 91 may be a green state, the second state 92 may be an orange state, and the third state 93 may be a red state.

In other words, according to an example of the sensor quality estimation method which may be performed by the sensing device 10, the specific sensor 63 is assigned to a certain quality class (e.g., green for a well-functioning sensor, orange for a slightly less sensitive sensor and red for a non-functioning/only slightly sensitive sensor) for instance by applying a machine learning model, e.g., as implemented by the first stage 22 and the second stage 26. Based on the result of the classification, i.e., the information 32 of the functional state, and depending on the type of sensor error, the malfunctioning sensors can then be replaced, repaired or the firmware could be updated leveraging the connectivity feature. FIG. 9 illustrates such classification for the case of surface effects influencing the sensitivity of the sensor. For other defect effects, also other solutions might be possible, as discussed with respect to FIG. 10.

Figure 10:
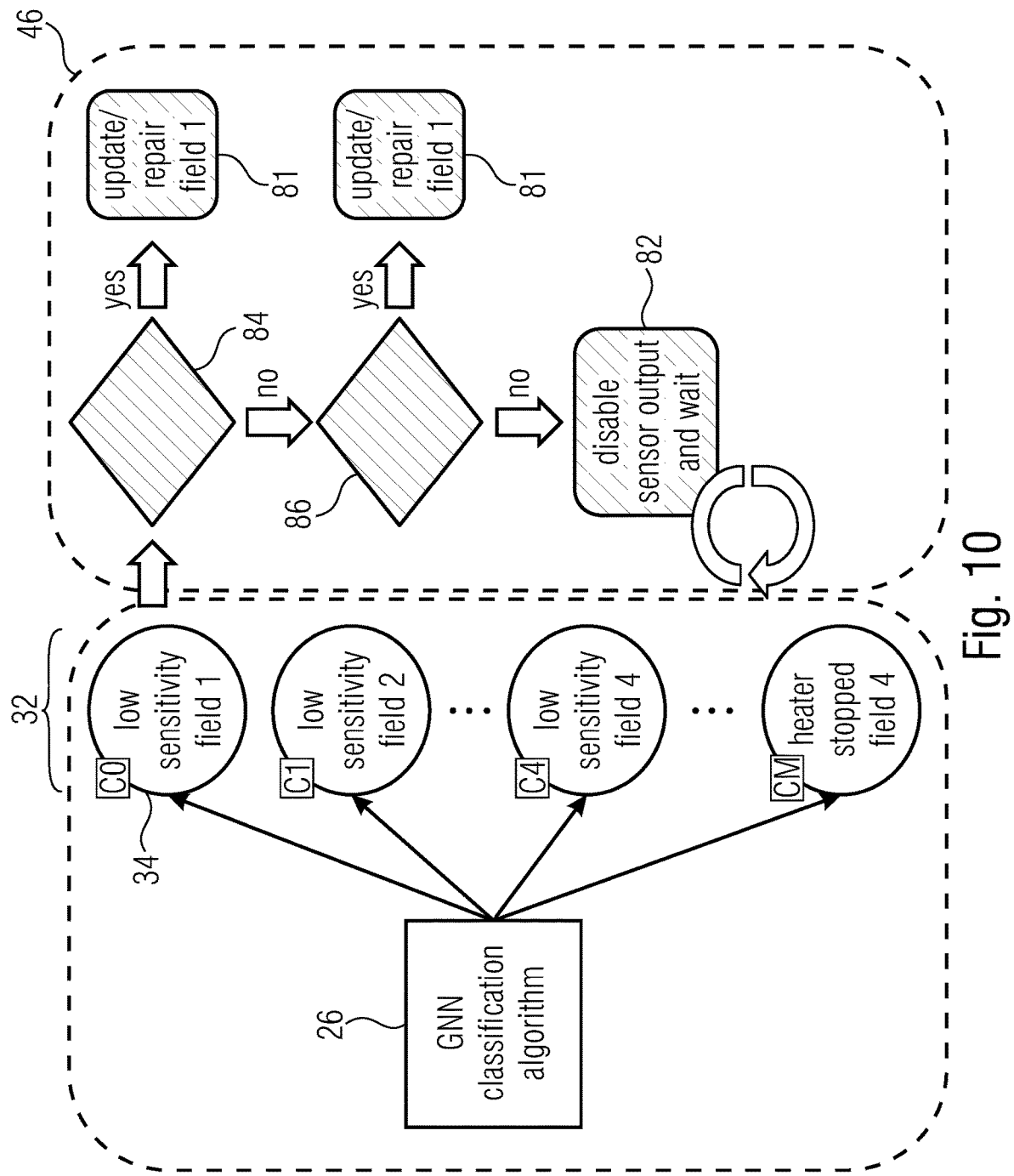
FIG. 10 illustrates an example of a maintenance evaluation step.

FIG. 10 illustrates an example of a maintenance step 46. Maintenance step 46 may be performed, as illustrated in FIG. 1c, on the basis of the information 32 about the functional state of the sensing device 10. For example, the maintenance step 46 may optionally be performed by the functional analysis module 16 according to FIG. 2. As described with respect to FIGS. 2 to 5, the information 32 about the functional state may indicate, for each of multiple fault types, a certainty, that the measurement module 12, or a sensing unit 63 of the measurement module 62, experiences a fault of the fault type. The certainty may be indicated as a certainty value or by means of indicating a state as described with respect to FIG. 9. The maintenance step 46 illustrated in FIG. 10 is an example of a maintenance step for a fault type of a low sensitivity of a sensing unit 63 of the sensing device 10 according to FIG. 7, but may generally be implemented for different fault types of the sensing unit 63 of sensing devices 10 having a different type of measurement module 12, cf. FIG. 1c. Depending on the certainties associated with the different fault types, i.e. classes, indicated in the information 32 about the functional state, e.g., the output vector of the GNN of the second stage 26, one or more actions may be triggered by the maintenance step 46. For example, for a selected fault type 34, e.g. the one for which the highest certainty is indicated, or for each of the fault types, in step 84 of the maintenance step 46, the certainty or state attributed to the fault type 34 may be tested versus a threshold, or in general, against a predetermined criterion. If the certainty exceeds the threshold, or if the state corresponds to a predetermined set of one or more states, a maintenance action 81 may be triggered. Otherwise, the certainty or the state attributed to the fault type 34 may optionally be tested against one or more further criterions in a step 86. In step 86, it may be tested whether the fault type 34 was the most probable fault type over a number of N subsequent cycles, in which case step 81 may be triggered. Otherwise, an alternative maintenance action 82 may be triggered. For example, the alternative maintenance action 82 may imply a disabling of the output of the sensing unit 63, to which the evaluated fault type 34 applies, and a repeated testing of the sensing unit after a time period. A disabling of the sensor output may mean that a measurement signal of the respective sensing unit 63 is disregarded in the determination of a calibrated measurement value of the environmental parameter to be determined by the sensing device 10.

The maintenance step 46 may be performed for one or more of the fault types, or classes, of the output vector of the GNN, i.e. the information 32, e.g. for one or more having the highest certainty or weight. The type of the maintenance action 81 may depend on the fault type. In other words, based on the output vector of the GNN a certain action may be triggered in dependence on which classes have the higher weight/certainty.

According to examples, the measurement module 62 is configured for determining concentrations of the plurality of target gases of the measurement module 62 on the basis of the measurement signals of the sensing units 63. According to these examples, the measurement module 62 is configured for disregarding a sensing unit 63 of the plurality of sensing units in the determination of the concentrations if the information about the functional state indicates that the sensing unit experiences a fault. It is noted that this feature is not limited to the implementation of the maintenance step 46 as described with respect to FIG. 9, but may be implemented in the sensing device 10 of FIG. 7 independent of the maintenance step 46.

By disregarding the sensing unit 63 for which the information 32 about the functional state indicates that the sensing unit 63 experiences a fault, a faulty determination of the concentration of the target gas may be avoided.

In other words, if a single sensor field 63 is found to be faulty, the repair action would correspond to silencing of that specific sensor 63, e.g., by software using a reduced model for mapping of the array responses to gas prediction.

Alternative maintenance actions, e.g., triggered in step 81, may be an activation of a backup sensor, if a second sensing unit is available. In other cases, the repair action would imply a stronger heating (longer and at high temperature) of a sensor (or sensor field) to facilitate the cleaning of the surface. In other words, with a judicious classifier output design, the Replace/Update step in FIG. 1c can effectively be tailored to the type of defect.

As explained with respect to step 86 of the maintenance step 46, the certainties of the various output classes may reflect the level of confidence, which the proposed combined mechanism (RNN+GNN) has with respect to the various categories of defect. In some cases, the maximum certainty across all target classes could be below a certain threshold, then the corresponding defect estimate will be ignored, the sensor will be 'temporarily' disabled until a subsequent cycle shows a higher max certainty or until N cycles have delivered the same results. Only at this point, a 'replace/update' step 81 is carried out.

According to examples, the sequence of measurement values 13 represents a temporal evolution of a measurement signal of the measurement module 12 over a time period of one day. For example, the measurement values are obtained by sampling a measurement signal of the measurement module 12, wherein a sampling rate may be in the order of minutes, for example five minutes. By choosing a sampling rate, and by choosing a length of the time period represented by the sequence of measurement values 13, a buffer size required for buffering the measurement values 13 before evaluating the measurement values 13 using the first stage 22 may be selected. For example, the sampling rat and the time period may be varied according to the requested sensor quality requirements for running the fault detection system, i.e., the functional analysis module 16.

It is noted that in comparison to FIG. 10, where the classes for the classification output, that is the information 32 about the functional state, may be associated with certainties for the specific fault types for each of the sensing units 63, the classification output may be handled differently, for example as described with respect to FIG. 9. That is, one possibility is to adopt color codes indicating the current quality of the sensor and the need for exchanging the sensor. Additionally, according to another example, the second stage 26 may output multiple nodes indicating the type of fault in order to be able to determine if the sensor has to be exchanged physically or if the sensor can be repaired remotely, for example in the case of a software through and over the air software update.

According to examples, instead of separating the feature extraction the classification algorithm as performed by the first stage 22 and the second stage 26, the steps performed by the first stage 22 and the second stage 26 may be combined in one neural network, for example by employing a GNN specifically designed for such tasks, for example a recurrent graph neural network (RecGNNs).

Furthermore, compared to conventional concepts for fault detection, the disclosed concept may go beyond a simple offset calculation between expected and measured sensor signals. It is pointed out that the second stage 26 may classify different fault related effects, that is, the information 32 about the functional state may not only indicate that the measurement module 12 experiences a fault but may identify a fault by attributing certainties to different fault types. That is, the second stage 26 may classify the fault. The classification of faults allows different types of faults to react with different types of action to repair the fault. Further, in contrast to conventional methods, the fault detection of the herein disclosed method may rely on a threshold on a certainty for the existence of a fault, rather than a threshold on a sensor signal, such increasing the reliability of the fault detection.

For example, the sensing device 10 may be deployed in an IOT scenario to track ground level pollution and in real life environments where various ambient conditions can affect the behavior of low cost components.

Figure 11A:
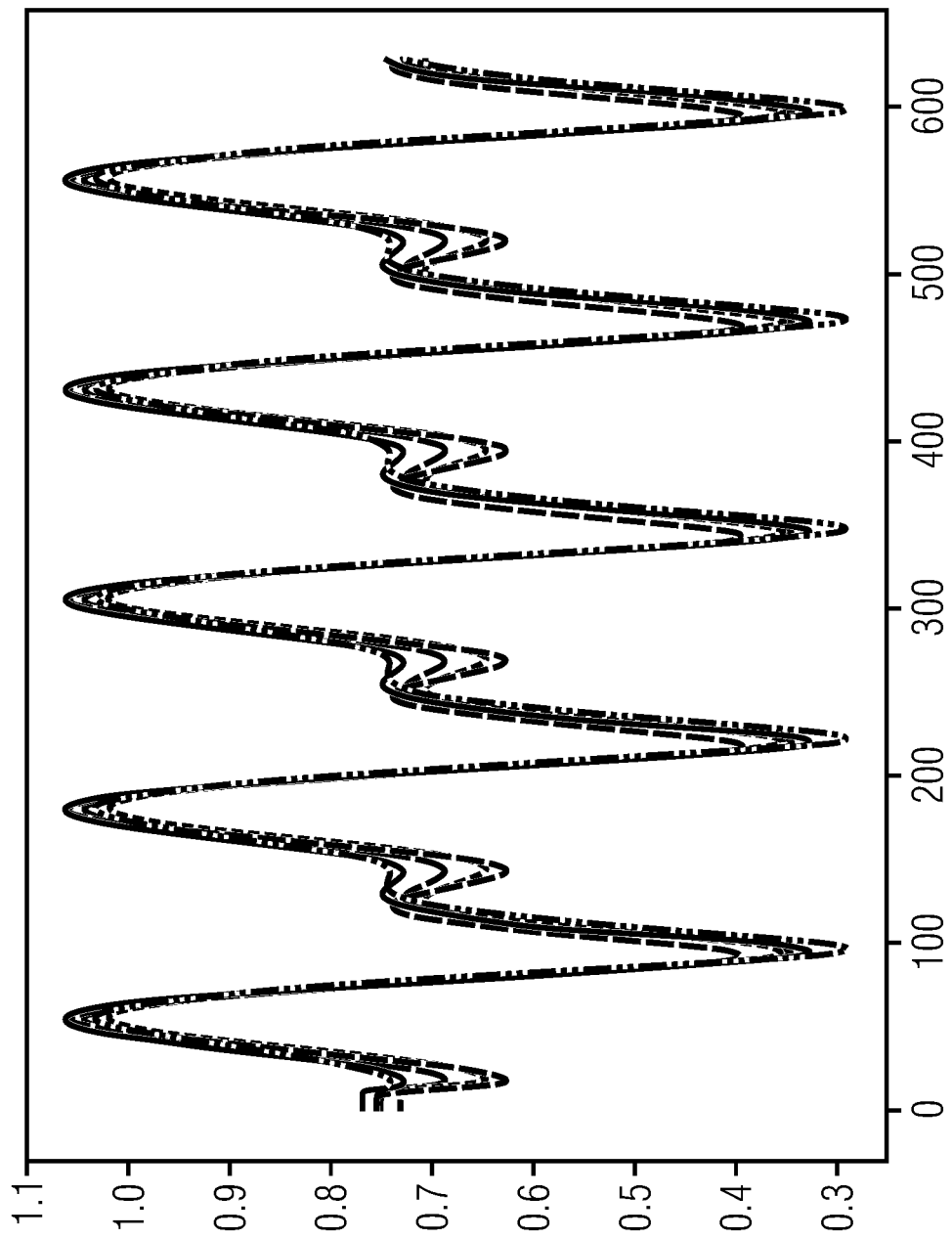
FIG. 11a shows an example of simulated temporal evolution of concentrations of a target gas.
Figure 11B:
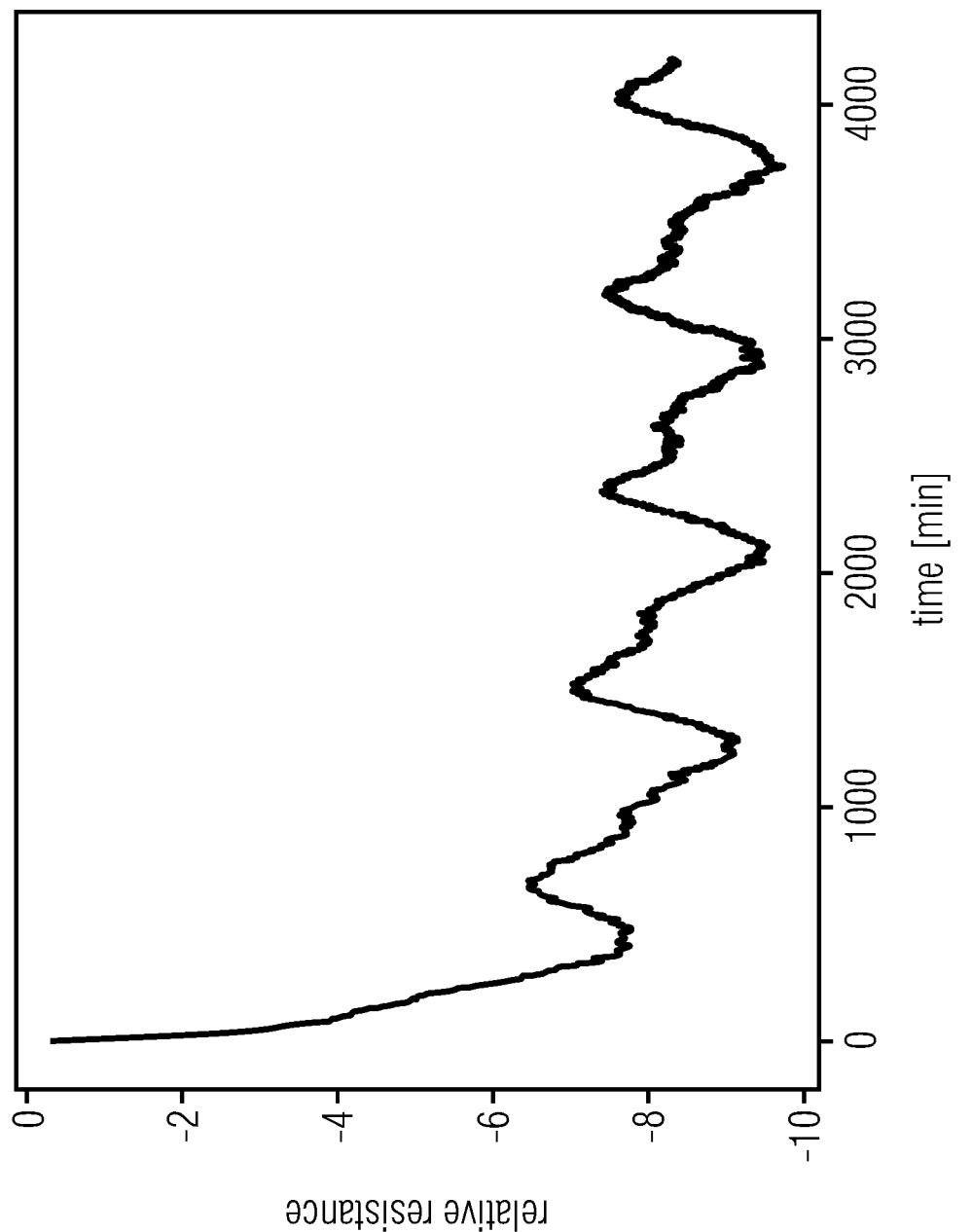
FIG. 11b shows an example of a simulation of a measurement signal.
Figure 12B:
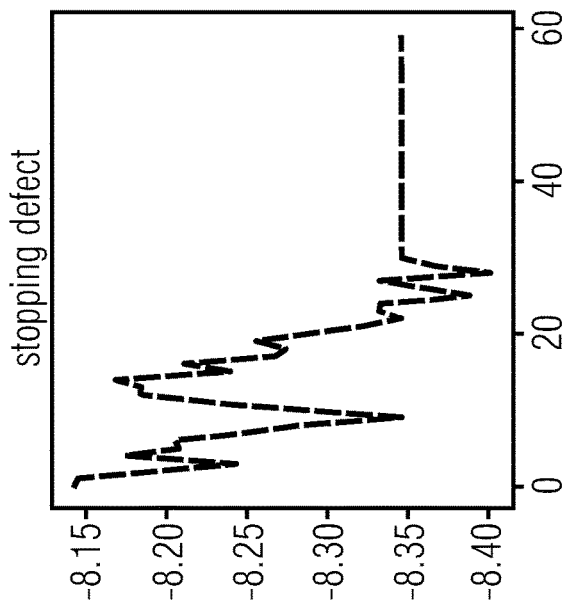
FIGS. 12a-12d illustrate examples of three different defect types.
Figure 12D:
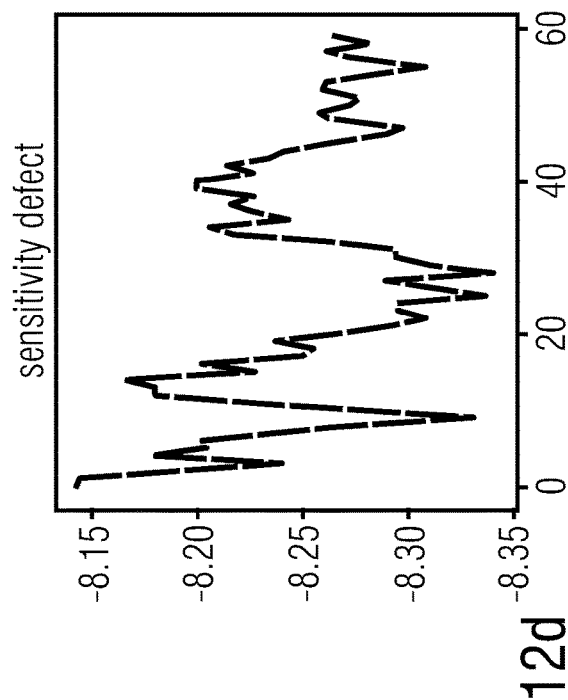
Figure 12A:
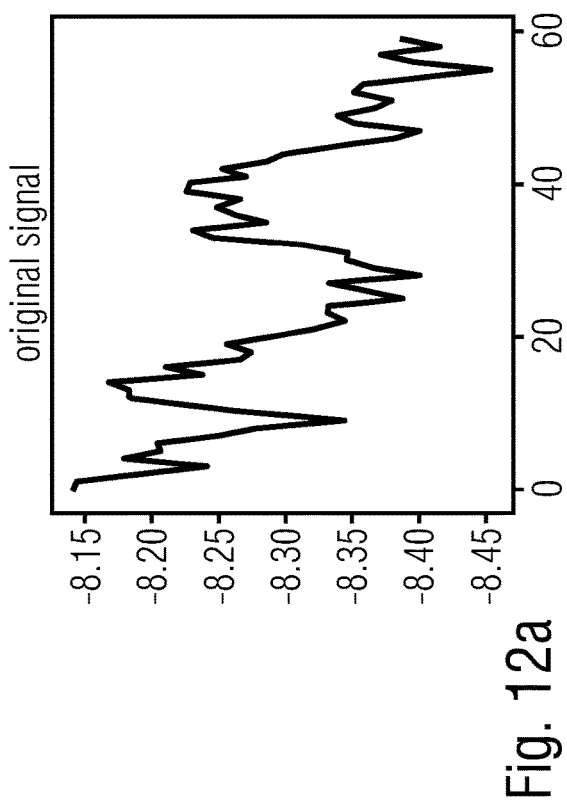
Figure 12C:
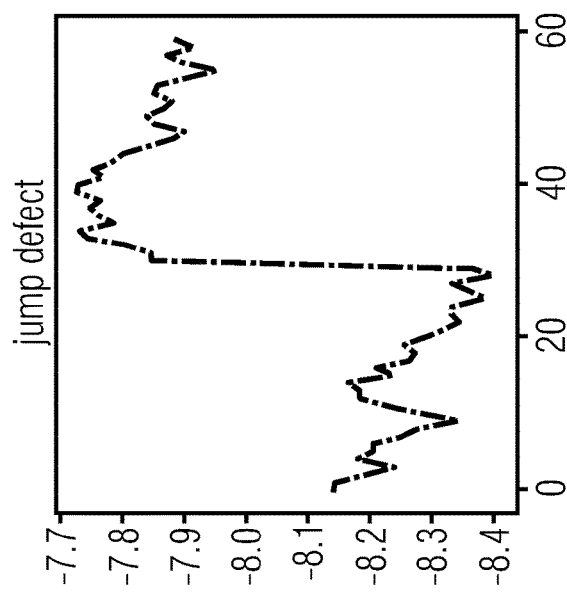

FIG. 11 shows an example of simulated temporal evolution of concentrations of a target gas at five different sensor positions. The data of FIG. 11a is obtained by placing two sources far away from the sensors and simulating concentrations of the target gas emitted by the sources at the respective sensor positions. FIG. 11b shows an example of a simulation of a measurement signal produced by one of the sensors in response to the concentration shown in FIG. 11a.

For example, the neural network of the first stage 22 and/or the second stage 26 may be trained by generating training data. This may be done, for example, by incorporating randomly one or more out of the different fault types for which the neural networks are to be trained.

FIG. 12 illustrates examples of three different defect types incorporated to the simulated measurement signal, e.g., that of FIG. 11b. While FIG. 12a shows the original signal, FIG. 12b shows a stopping defect, FIG. 12c a jump defect and FIG. 12d a sensitivity defect, i.e., a sensitivity drop. For example, the data shown in FIG. 12 may be used for training the neural networks.

Figure 13:
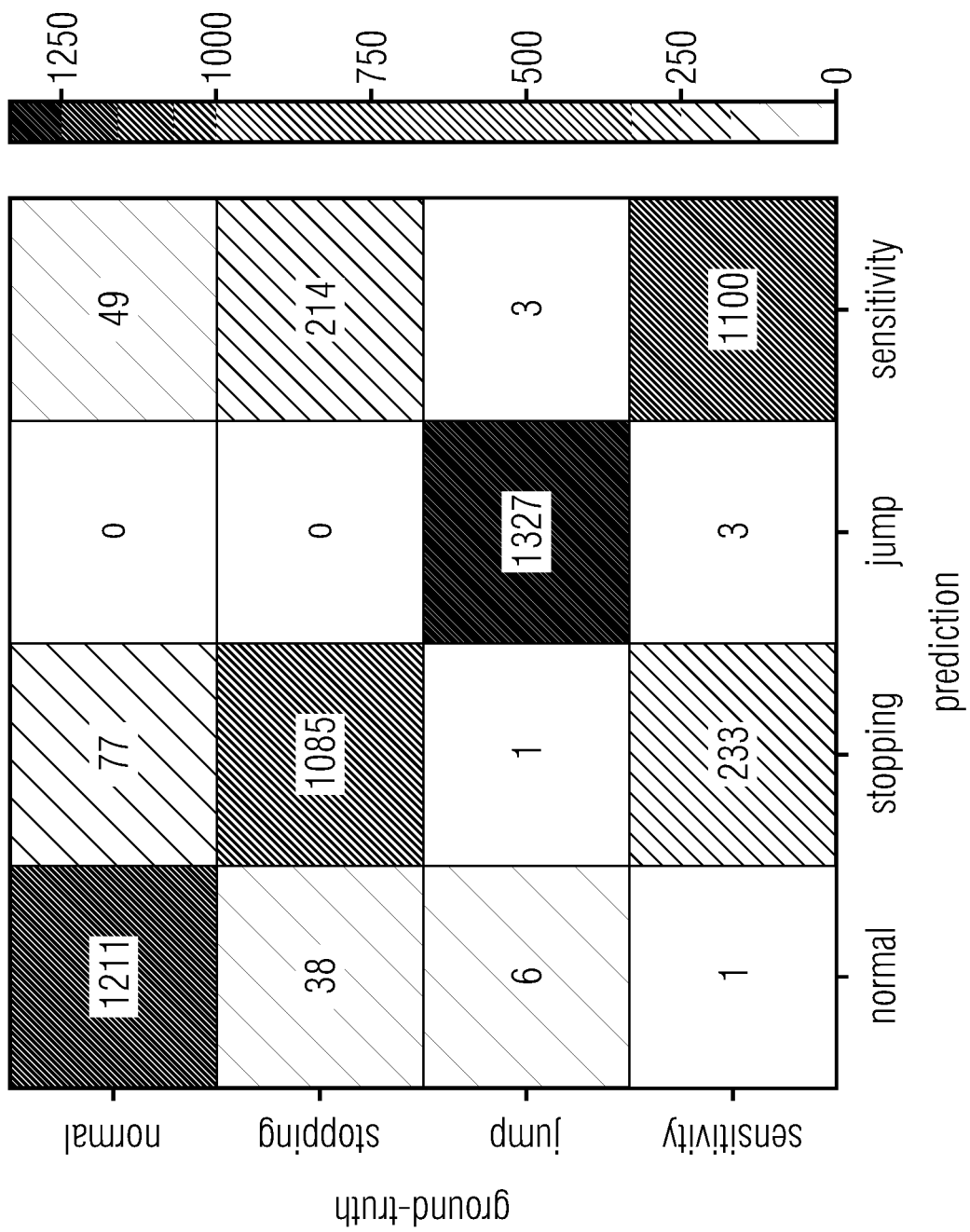
FIG. 13 illustrates an evaluation of a reliability of an example for identifying fault types.

FIG. 13 illustrates an evaluation of the reliability of identifying a fault type of an example of the present disclosure. According to the example of FIG. 13, the model is a simultaneous RNN structure using GRUs for temporal feature extraction of each of the five sensors and a FFNN network on top. Such an implementation is particularly simple, and thus may be realized with low hardware requirements. The network may be trained with random occurrences of defects on the simulated signal. It was then tested on a set comprising all possible defect locations in the signal with the 4 different signal defect states each. The model was evaluated after 150 epochs with a learning rate of 0.01. FIG. 13 shows the confusion matrix of the model. It shows that the model is quite good at classifying the different defect states, especially for normal signals and jump defect signals. In the case of sensor stopping defects and sensitivity drop, there seems to be a small cross-correlation between the two groups. Overall, the prediction capability of this rather small network is already quite good on the simplified concentration profiles.

It should be emphasized that for more complex environments, the geometric properties of the sensor network are expected to become more important for the general performance for defect detection, especially for the detection of sensitivity loss. A simple RNN/FFNN structure as in the example of FIG. 13 may be more prone to environmental conditions such as wind directions, since this can change the reaction latencies between the sensors in the network. In order to prevent this case, the geometric network properties (distances between the sensors, wind direction, wind speed, presence/concentration of further gases beside the target gas of the sensing device 10 etc.) may be taken into account, e.g., by using a GNN to make the machine learning model more flexible to such varying conditions, also to enhance flexibility. A general GNN trained on different geometries might be applicable to several network cases, which means that it would not be necessary to train each sensor subnetwork individually. For these reasons, a GNN may be a better-suited choice for implementation of the method in a sensor network.

Examples of the sensing device 10 may implement an edge-computing approach, specifically suited for environmental sensors in order to detect various types of faults that might occur in such devices when deployed in a realistic deployment. Examples may be related to an IoT-based method, which resorts to machine learning for sensor defect detection.

Examples of the sensing device 10 may be implemented as micro-electro-mechanical system (MEMS device).

Figure 14:
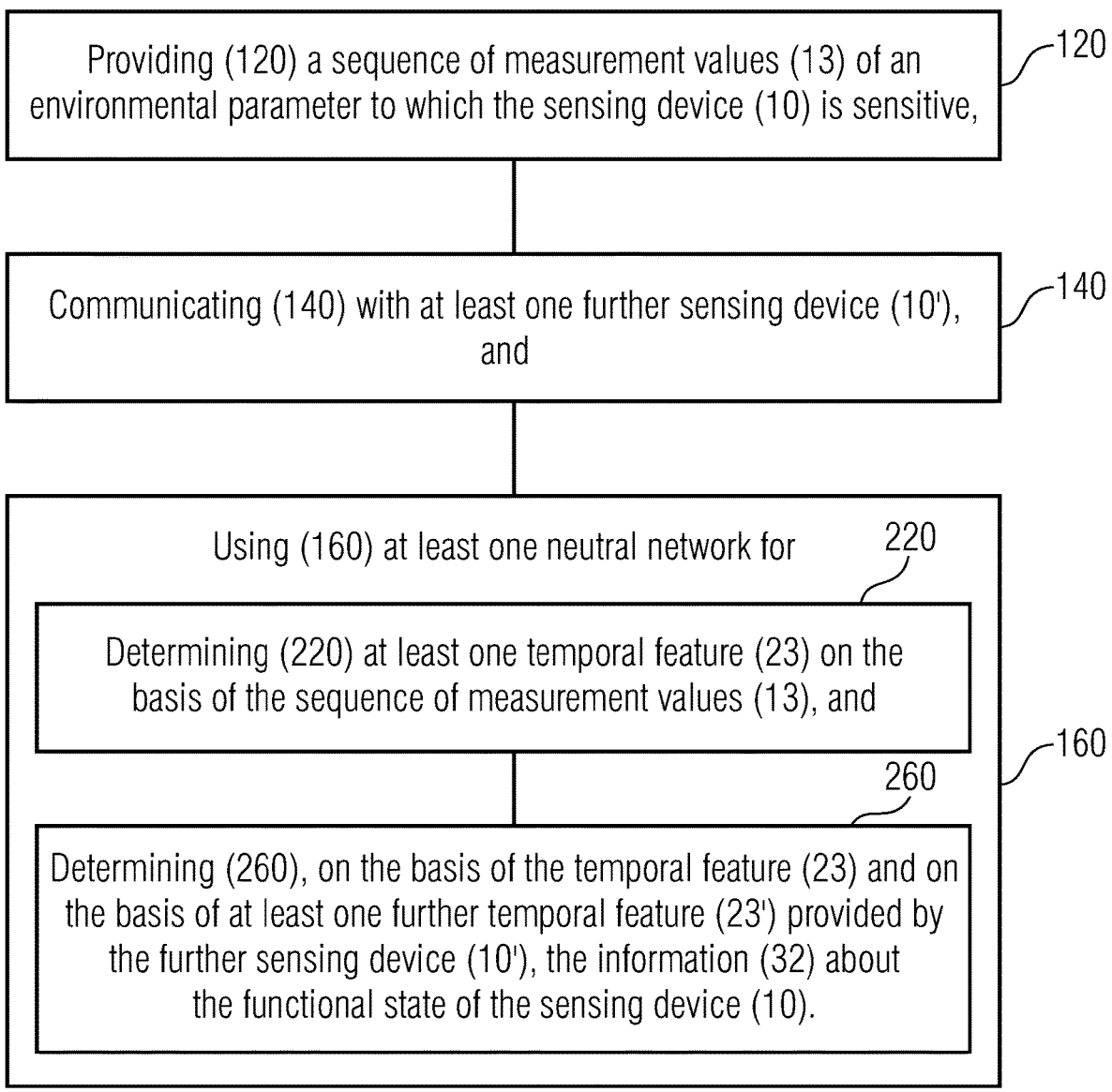
FIG. 14 illustrates a block diagram of an example of a method for determining information about a functional state of a sensing device.

FIG. 14 illustrates a block diagram of a method 100 for determining information 32 about a functional state of a sensing device 10. The method 100 comprises a step 120 of providing a sequence of measurement values 13 of an environmental parameter to which the sensing device 10 is sensitive. Further, the method 100 comprises a step 140 of communicating with at least one further sensing device 10'. Further, the method 100 comprises a step 160 of using at least one neural network for a step 220 of determining at least one temporal feature 23 on the basis of the sequence of measurement values 13. Step 160 further comprises using the at least one neural network for a step 260 of determining, on the basis of the temporal feature 23 and on the basis of at least one further temporal feature 23' provided by the further sensing device 10', the information 32 about the functional state of the sensing device 10.

According to examples, step 120 may be performed by the measurement module 12, step 140 may be performed by the communication module 14, and step 160 may be performed by the functional analysis module 16. Step 220 may be performed by the first stage 22 and step 260 may be performed by the second stage 26. Accordingly, features and details described with respect to the sensing device 10 in the context of FIG. 1a to FIG. 13 may optionally also apply or be implemented in the method 100 of FIG. 14.

According to examples, step 220 may be performed using a recurrent neural network.

According to examples, step 160 comprises using spatial information about the sensing device 10 and the further sensing device 10' for determining the information 32 about the functional state, for example, in step 260. According to examples, step 260 is performed using a neural network, for example a graph neural network.

According to examples, the sequence of measurement values 13 represents a temporal evolution of the environmental parameter over a time period of at least one hour, or at least five hours.

According to examples, the method comprises a step of providing the temporal feature for one or more further sensing devices 10'.

According to examples, step 140 comprises receiving the further temporal feature 23' directly from the further sensing device 10'.

According to examples, step 140 is performed by communicating with further sensing device 10' via a short-range wireless communication interface, e.g., Bluetooth, so as to receive the further temporal feature 23'.

According to an example, step 140 includes obtaining information about a location of the further sensing device 10'.

According to an example, the information about the functional state indicates, for each of one or more fault types of the sensing device 10, a certainty (or a probability) that the sensing device 10 experiences a fault of the fault type.

According to examples, the environmental parameter is a concentration of a target gas and the method comprises obtaining a plurality of measurement signals of respective sensing units 63 of the sensing device 10, the measurement signals representing a temporal evolution of concentrations of a plurality of target gases. According to these examples, the method comprises providing, on the basis of the plurality of the measurement signals, respective sequences of measurement values. According to these examples, step 160 comprises determining a plurality of temporal features 23 on the basis of the sequences of measurement values 13 and determining, on the basis of the temporal features 23 and on the basis of further temporal features 23' provided by the further sensing device 10', the information 32 about the functional state of the measurement module. According to these examples, the information 32 about the functional state indicates, for at least one or each of a plurality of the sensing units, a certainty (or a probability) that the sensing unit experiences a fault.

According to examples, the information 32 about the functional state indicates, for each of the sensing units, for each of one or more fault types of the sensing units, a certainty (or a probability) that the sensing unit experiences a fault of the fault type.

According to examples, the method 100 comprises a step of determining concentrations of the plurality of target gases on the basis of the measurement signals of the sensing units. According to these examples, the step of determining concentration of the plurality of target gases comprises disregarding a sensing unit of the plurality of sensing units in the determination of the concentrations if the information about the functional state indicates that the sensing unit experiences a fault.

According to examples, step 160 comprises initiating a maintenance action in dependence on the information about the functional state.

Further examples of the present disclosure include: a Sensing device 10 for sensing an environmental parameter, comprising a measurement module 12 configured for providing a sequence of measurement values 13 in dependence on the environmental parameter; further comprising a communication module 14 configured for communicating with at least one further sensing device 10'; further comprising a function analysis module 16 configured for using at least one neural network for determining at least one temporal feature 23 on the basis of the sequence of measurement values 13, and configured for determining, on the basis of the temporal feature 23 and on the basis of at least one further temporal feature 23' provided by the further sensing device 10', information 32 about a functional state of the measurement module 12.

According to examples, the function analysis module 16 is configured for using a recurrent neural network for determining the temporal feature 23 on the basis of the sequence of measurement values 13.

According to examples, the function analysis module 16 is configured for using spatial information about the sensing device 10 and the further sensing device 10' for determining the information about the functional state.

According to examples, the function analysis module 16 is configured for using a neural network, e.g. a graph neural network, for determining the information about the functional state on the basis of the temporal feature 23, the further temporal feature 23', and the spatial information.

According to examples, the sequence of measurement values 13 represents a temporal evolution of the environmental parameter over a time period of at least one hour, or at least five hours.

According to examples, the communication module 14 is configured for providing the temporal feature 23 for one or more further sensing devices 10'.

According to examples, the communication module 14 is configured for receiving the further temporal feature 23' directly from the further sensing device 10'.

According to examples, the communication module 14 is configured for communicating with the further sensing device 10' via a short-range wireless communication interface, e.g. Bluetooth, so as to receive the further temporal feature 23'.

According to examples, the communication module 14 is configured to obtain information 32 about a location of the further sensing device 10'.

According to examples, the information about the functional state indicates, for each of one or more fault types of the measurement module 12, a certainty (or a probability) that the measurement module 12 experiences a fault of the fault type.

According to examples, the environmental parameter is a concentration of a target gas, wherein the measurement module 12, 62 comprises a plurality of sensing units 63 each of which is sensitive to a target gas out of a plurality of target gases, wherein the measurement module 62 is configured for providing, on the basis of respective measurement signals of the sensing units, respective sequences of measurement values 13 of the sensing units 63. According to these examples, the function analysis module 16 is configured for determining a plurality of temporal features 23 on the basis of the sequences of measurement values 13, and for determining, on the basis of the temporal features 23 and on the basis of further temporal features 23' provided by the further sensing device 10', the information about a functional state of the measurement module 12. According to these examples, the information 32 about the functional state of the measurement module 12 indicates, for at least one or each of the sensing units 63, a certainty (or a probability) that the sensing unit experiences a fault.

According to examples, the information about the functional state indicates, for each of the sensing units, for each of one or more fault types of the sensing units, a certainty (or a probability) that the sensing unit experiences a fault of the fault type.

According to examples, the measurement module 12 is configured for determining concentrations of the plurality of target gases on the basis of the measurement signals of the sensing units. According to these examples, the measurement module 12 is configured for disregarding a sensing unit of the plurality of sensing units in the determination of the concentrations, if the information about the functional state indicates that the sensing unit experiences a fault.

According to examples, the function analysis module 16 is configured for initiating a maintenance action 81 in dependence on the information 32 about the functional state.

A method for determining information 32 about a functional state of a sensing device 10, the method comprising: providing 120 a sequence of measurement values 13 of an environmental parameter to which the sensing device 10 is sensitive; communicating 140 with at least one further sensing device 10'; using 160 at least one neural network for determining 220 at least one temporal feature 23 on the basis of the sequence of measurement values 13; and using 160 the at least one neural network for determining 260, on the basis of the temporal feature 23 and on the basis of at least one further temporal feature 23' provided by the further sensing device 10', the information 32 about the functional state of the sensing device 10.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some examples, one or more of the most important method steps may be executed by such an apparatus.

Depending on certain implementation requirements, examples of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples according to the invention comprise a data carrier having electronically readable control signals, which are capable of cooperating with a programmable computer system, such that one of the methods described herein is performed.

Generally, examples of the present invention can be implemented as a computer program product with a program code, the program code being operative for performing one of the methods when the computer program product runs on a computer. The program code may for example be stored on a machine-readable carrier.

Other examples comprise the computer program for performing one of the methods described herein, stored on a machine-readable carrier.

In other words, an example of the inventive method is, therefore, a computer program having a program code for performing one of the methods described herein, when the computer program runs on a computer.

A further example of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further example of the inventive method is, therefore, a data stream or a sequence of signals representing the computer program for performing one of the methods described herein. The data stream or the sequence of signals may, for example, be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above-described examples are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the examples herein.

What is claimed is:

1. A sensing device for sensing an environmental parameter, comprising:
    a measurement module configured for providing a sequence of measurement values in dependence on the environmental parameter,
    a communication module configured for communicating with a further sensing device,
    a function analysis module coupled to the measurement module and the communication module, the function analysis module comprising:
        a first stage comprising a recurrent neural network for determining a first temporal feature on the basis of the sequence of measurement values, wherein the recurrent neural network is configured to perform all neural processing to determine the first temporal feature, and the first temporal feature is determined based on measurement values of only the sensing device, and
        a second stage comprising a graph neural network for determining information about a functional state of the measurement module on the basis of input comprising the first temporal feature, a second temporal feature provided by the further sensing device, and spatial information comprising a relative spatial arrangement between the sensing device and the further sensing device, wherein the measurement module, the communication module and the function analysis module are co-located together, and the further sensing device is external to the sensing device.

2. The sensing device according to claim 1, wherein the sequence of measurement values represents a temporal evolution of the environmental parameter over a time period of at least one hour.

3. The sensing device according to claim 1, wherein the communication module is configured for providing the first temporal feature to the further sensing device.

4. The sensing device according to claim 1, wherein the communication module is configured for receiving the second temporal feature directly from the further sensing device.

5. The sensing device according to claim 1, wherein the communication module is configured for communicating with the further sensing device via a short-range wireless communication interface to receive the second temporal feature.

6. The sensing device according to claim 5, wherein the short-range wireless communication interface comprises a Bluetooth communication interface.

7. The sensing device according to claim 1, wherein the communication module is configured to obtain information about a location of the further sensing device.

8. The sensing device according to claim 1, wherein the information about the functional state indicates, for each of one or more respective fault types of the measurement module, a certainty that the measurement module experiences a fault of the respective fault type.

9. The sensing device according to claim 1, wherein the measurement module comprises a plurality of sensing units each of which is sensitive to a target gas of a plurality of target gases, wherein the environmental parameter is a concentration of the target gas, wherein the measurement module is configured for providing, on the basis of respective measurement signals of the plurality of sensing units, respective sequences of measurement values of the plurality of sensing units,
    wherein the function analysis module is configured for determining a first plurality of temporal features on the basis of the sequences of measurement values, and for determining, on the basis of the first plurality of temporal features and on the basis of a plurality of second temporal features provided by the further sensing device, the information about the functional state of the measurement module, and
    wherein the information about the functional state of the measurement module indicates, for at least one of the plurality of sensing units, a certainty that the at least one of the plurality of sensing units experiences a fault.

10. The sensing device according to claim 9, wherein the information about the functional state indicates, for each of the plurality of sensing units, for each of one or more fault types of the plurality of sensing units, a certainty that a respective sensing unit of the plurality of sensing units experiences a fault of the respective fault type.

11. The sensing device according to claim 9, wherein the measurement module is further configured for determining concentrations of the plurality of target gases on the basis of the respective measurement signals of the plurality of sensing units,
    wherein the measurement module is configured for disregarding a first sensing unit of the plurality of sensing units in the determination of the concentrations, in response to the information about the functional state indicating that the first sensing unit experiences a fault.

12. The sensing device according to claim 1, wherein the function analysis module is configured for initiating a maintenance action in dependence on the information about the functional state.

13. The sensing device according to claim 12, wherein the maintenance action comprises deactivating the measurement module or recalibrating the measurement module based on the functional state.

14. The sensing device according to claim 1, wherein the spatial information includes at least one of: a distance between the sensing device and the further sensing device, a location of the sensing device, or a location of the further sensing device.

15. The sensing device according to claim 1, wherein the spatial information includes at least one of: wind speed, wind direction, or information about presence or concentration of one or more gases different from a target gas.

16. A method for determining information about a functional state of a first sensing device, the method comprising:
providing, by a measurement module, a sequence of measurement values of an environmental parameter to which the first sensing device is sensitive,
communicating, by a communication module, with a second sensing device,
using, by the first sensing device, a recurrent neural network to determine a first temporal feature on the basis of the sequence of measurement values, wherein the recurrent neural network is configured to perform all neural processing to determine the first temporal feature, wherein the first temporal feature is determined based on measurement values of only the first sensing device, and
after using the recurrent neural network to determine the first temporal feature, using, by the first sensing device, a graph neural network to determine the information about the functional state of the first sensing device on the basis of input comprising the first temporal feature, a second temporal feature provided by the second sensing device, and spatial information comprising a relative spatial arrangement between the first sensing device and the second sensing device, wherein the measurement module, the communication module, the recurrent neural network, and the graph neural network are co-located together within the first sensing device, and the second sensing device is external to the first sensing device.

17. The method according to claim 16, further comprising initiating a maintenance action in dependence on the information about the functional state, wherein the maintenance action comprises deactivating the measurement module or recalibrating the measurement module.

18. The method according to claim 16, wherein the spatial information includes at least one of: a distance between the first sensing device and the second sensing device, a location of the first sensing device, or a location of the second sensing device.

19. A gas sensing system comprising:
a first sensor configured to provide a first sequence of measurement values indicative of a concentration of a target gas, wherein the first sensor comprises a gas sensor;
a communication circuit configured to be coupled to a second sensor; and
an analysis circuit coupled to the first sensor and to the communication circuit, the analysis circuit configured to:
determine a first temporal feature based on the first sequence of measurement values using a recurrent neural network, wherein the recurrent neural network is configured to perform all machine learning processing to determine the first temporal feature, and the first temporal feature is determined based on measurement values of only the gas sensing system, and
use a graph neural network to determine information about a functional state of the first sensor based on input comprising the first temporal feature, a second temporal feature received from the second sensor, and spatial information comprising a relative spatial arrangement between the first sensor and the second sensor, wherein the graph neural network is configured to perform all machine learning processing to determine the information about the functional state of the first sensor based on the first temporal feature, the second temporal feature and the spatial information, and wherein the first sensor, the communication circuit and the analysis circuit are co-located together within the gas sensing system, and the second sensor is external to the gas sensing system.

20. The gas sensing system according to claim 19, wherein the second temporal feature is indicative of an environmental parameter affecting the first sensor.

21. The gas sensing system according to claim 19, wherein the analysis circuit is further configured to initiate a maintenance action in dependence on the information about the functional state, wherein the maintenance action comprises deactivating the first sensor or recalibrating the first sensor.

22. The gas sensing system according to claim 19, wherein the spatial information includes at least one of: a distance between the first sensor and the second sensor, a location of the first sensor, or a location of the second sensor.

* * * * *